US010807798B1

(12) United States Patent
Kalm et al.

(10) Patent No.: US 10,807,798 B1
(45) Date of Patent: Oct. 20, 2020

(54) INVENTORY STORAGE MODULE HAVING ACTUATORS THAT MOVE STORAGE TOTES AROUND A CONVEYOR LOOP

(71) Applicant: Amazon Technologies, Inc., Seattle, WA (US)

(72) Inventors: William Scott Kalm, Seattle, WA (US); Benjamin Douglas Garcia, Seattle, WA (US); Vahideh Kamranzadeh, Seattle, WA (US); Dinesh Mahadevan, Lynnwood, WA (US); Seshachalamgupta Motamarri, Redmond, WA (US); Tyson Wittrock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 15/799,847

(22) Filed: Oct. 31, 2017

(51) Int. Cl.
*B65G 1/06* (2006.01)

(52) U.S. Cl.
CPC ..................................... *B65G 1/06* (2013.01)

(58) Field of Classification Search
CPC ........ B65G 1/06; B65G 1/133; B65G 1/0485; B65G 1/1376; B65G 1/1378; B65G 25/08; B65G 25/10; B65G 25/12; B65G 29/00; B65G 35/063; B65G 35/08; B65G 47/265; B65G 47/82; B65G 47/844; B65G 47/845;

(Continued)

(56) References Cited

U.S. PATENT DOCUMENTS

| 1,905,924 A | 4/1933 | MacLauchlan |
| 2,999,579 A * | 9/1961 | Kostrzewa ........... B23Q 7/1489 198/795 |
| 3,184,030 A | 5/1965 | Herbert |

(Continued)

FOREIGN PATENT DOCUMENTS

| DE | 2013005 A1 | 9/1971 |
| DE | 2552914 A1 | 6/1976 |

(Continued)

OTHER PUBLICATIONS

U.S. Appl. No. 15/408,128, filed Jan. 17, 2017, Battles et al.

(Continued)

*Primary Examiner* — Glenn F Myers
(74) *Attorney, Agent, or Firm* — BakerHostetler

(57) ABSTRACT

In one embodiment, an inventory storage module has first to fourth conveyor segments that define a conveying loop. The module translates storage totes around the conveying loop using, at least in part, first and second actuator assemblies. The first actuator assembly has a first actuator and a first crossbar connected to the first actuator. The first actuator assembly moves the first crossbar in a first direction such that the first crossbar engages and pushes totes along the first conveyor segment in the first direction. The second actuator assembly has a second actuator and a second crossbar connected to the second actuator. The second actuator assembly moves the second crossbar in a second direction, opposite the first direction, such that the second crossbar engages and pushes totes along the second segment in the second direction. The third and fourth segments transfer totes between the first and second segments.

15 Claims, 13 Drawing Sheets

(58) Field of Classification Search
CPC ............ B65G 47/8838; B65G 47/8846; B65G 47/763; B65G 47/76
USPC .................... 414/285, 331.08, 331.1, 331.03; 198/715, 736, 747, 749
See application file for complete search history.

(56) References Cited

U.S. PATENT DOCUMENTS

| | | | |
|---|---|---|---|
| 3,809,208 | A | 5/1974 | Shields |
| 3,904,022 | A * | 9/1975 | Lutz ........................ B60P 1/36 198/580 |
| 4,093,086 | A | 6/1978 | Lucas et al. |
| 4,346,803 | A | 8/1982 | Haessler et al. |
| 4,372,723 | A | 2/1983 | De Coene et al. |
| 4,378,873 | A | 4/1983 | Cloudy |
| 4,465,417 | A | 8/1984 | Baumann et al. |
| 4,645,058 | A | 2/1987 | Meyn |
| 4,934,507 | A | 6/1990 | Blocker |
| 4,972,937 | A * | 11/1990 | Aarts ................... B23Q 7/1478 198/465.2 |
| 5,387,064 | A | 2/1995 | Cardinal |
| 5,465,827 | A | 11/1995 | Nakagawa et al. |
| 5,472,309 | A | 12/1995 | Bernard, II et al. |
| 5,707,199 | A | 1/1998 | Faller |
| 6,059,229 | A * | 5/2000 | Luria ..................... B65G 1/133 198/465.1 |
| 6,098,786 | A | 8/2000 | Brumm et al. |
| 6,336,549 | B1 | 1/2002 | Jen |
| 6,626,282 | B1 | 9/2003 | Nishizawa et al. |
| 6,752,583 | B2 | 6/2004 | Rajewski |
| 6,784,391 | B2 | 8/2004 | Takizawa |
| 6,814,214 | B2 | 11/2004 | Warlow et al. |
| 6,814,221 | B2 | 11/2004 | Goussev |
| 7,090,068 | B2 | 8/2006 | Matsuo |
| 7,381,022 | B1 | 6/2008 | King |
| 7,637,367 | B1 | 12/2009 | Cannell |
| 7,798,305 | B2 | 9/2010 | Camelli |
| 8,308,418 | B2 | 11/2012 | Ma et al. |
| 8,807,320 | B2 | 8/2014 | Fortenbery et al. |
| 8,882,433 | B2 * | 11/2014 | Bonora ............. H01L 21/67766 414/331.03 |
| 8,939,296 | B2 | 1/2015 | Weyler et al. |
| 8,972,045 | B1 | 3/2015 | Mountz et al. |
| 9,028,613 | B2 | 5/2015 | Kim et al. |
| 9,139,363 | B2 | 9/2015 | Lert |
| 9,434,558 | B2 | 9/2016 | Criswell |
| 9,520,012 | B2 | 12/2016 | Stiernagle |
| 9,550,626 | B2 | 1/2017 | Parodi et al. |
| 9,718,625 | B2 | 8/2017 | Huang |
| 9,796,527 | B1 | 10/2017 | Kaukl et al. |
| 2008/0093313 | A1 | 4/2008 | Huber |
| 2008/0298943 | A1 | 12/2008 | Siegel et al. |
| 2010/0316468 | A1 | 12/2010 | Lert et al. |
| 2011/0313811 | A1 | 12/2011 | Urban et al. |
| 2012/0118699 | A1 | 5/2012 | Buchmann et al. |
| 2015/0175354 | A1 | 6/2015 | Kharkover |
| 2015/0178673 | A1 | 6/2015 | Penneman |
| 2015/0352721 | A1 | 12/2015 | Wicks et al. |
| 2015/0360865 | A1 | 12/2015 | Massey |
| 2016/0075512 | A1 | 3/2016 | Lert, Jr. |
| 2016/0178033 | A1 | 6/2016 | Chung |
| 2016/0214796 | A1 | 7/2016 | Stefani et al. |
| 2017/0036859 | A1 | 2/2017 | Lopes Ribeiro |
| 2017/0107056 | A1 | 4/2017 | Kadaba et al. |
| 2017/0225890 | A1 * | 8/2017 | Li ........................ B65G 1/023 |
| 2018/0037410 | A1 | 2/2018 | DeWitt |
| 2018/0201445 | A1 | 7/2018 | Battles et al. |
| 2018/0215534 | A1 | 8/2018 | Munholland |

FOREIGN PATENT DOCUMENTS

| | | |
|---|---|---|
| DE | 3941754 A1 | 6/1991 |
| DE | 102013008872 A1 | 11/2014 |
| FR | 2292646 A1 | 6/1976 |
| GB | 1516120 A | 6/1978 |
| JP | S54-031175 A | 3/1979 |
| JP | 61-114907 A | 6/1986 |
| JP | H01-162611 A | 6/1989 |
| JP | H05-294181 A | 11/1993 |
| JP | H05-294412 A | 11/1993 |
| JP | H05-319517 A | 12/1993 |
| WO | WO 2002/074663 A1 | 9/2002 |
| WO | WO 2007/036250 A1 | 4/2007 |
| WO | WO 2014/092145 A1 | 6/2014 |
| WO | WO 2015/147033 A1 | 10/2015 |

OTHER PUBLICATIONS

U.S. Appl. No. 15/408,207, filed Jan. 17, 201, Battles et al.
U.S. Appl. No. 15/408,182, filed Jan. 17, 2017, Battles et al.
U.S. Appl. No. 15/797,562, filed Oct. 30, 2017, Kalm et al.
U.S. Appl. No. 15/721,280, filed Sep. 29, 2017, Kalm et al.
"Vertical Lift Modules—Shuttle XP Family Flexible Storage Solutions in a Compact Footprint"; http://www.kardexremstar.com/us/materials-handling-storage-solutions/vertical-lift-modules.html; kardexremstar; accessed Mar. 16, 2018; 8 pages.
"Modular Diamond Phoenix Horizontal Carousels"; https://www.modula.us/products/modula-diamond-phoenix-horizontal-carousels.html Modula HC; accessed Mar. 16, 2018; 6 pages.
"Robots are AutoStore's iconic laborers"; http://www.autostoresystem.com/Products/Robot; AutoStore; accessed Mar. 19, 2018; 5 pages.
"3D-Matrix Solution"; https://www.ssi-schaefer.com/en-us/products/order-picking/automated-order-picking/3d-matrix-solution--53844; SSI Schafer; accessed Mar. 19, 2018; 4 pages.
"Dematic Multishuttle 2"; http://www.dematic.com/en-us/supply-chain-solutions/by-technology/storage-systems/dematic-multishuttle-2/; Dematic; accessed Mar. 19, 2018; 6 pages.
"AS/RS Solutions"; https://www.intelligrated.com/solutions/asrs-solutions; Honeywell Integrated; © 2018; accessed Mar. 19. 2018; 2 pages.
"AS/RS Systems for Distribution & Manufacturing"; http://www.cisco-eagle.com/material-handling-systems/asrs-systems; Cisco-Eagle; © 2018; accessed Mar. 19, 2018; 6 pages.
"Power Automation Systems—PowerStor Deep Lane ASRS"; https://www.youtube.com/watch?v=zJOAVOWluro; Power Automation Systems; Sep. 2011; accessed Mar. 19, 2018; 2 pages.
"AutoStore Logistic—Technical presentation"; https://www.youtube.com/watch?v=iyVDMp2bL9c; Aug. 2009; accessed Mar. 19, 2018; 3 pages.
"Scalable multi-level shuttle Navette at Karl Storz: A future-proof investments"; https://www.youtube.com/watch?v=jEyqkQFp1Uw; SSI Schafer; Jun. 2016; accessed Mar. 19, 2018; 2 pages.
"Automated Vertical Carousels"; https://www.youtube.com/watch?v=5STR9jKABxQ; Cisco-Eagle; Dec. 2015; accessed Mar. 19, 2018; 2 pages.
International Patent Application No. PCT/US2018/013922; Int'l Search Report and the Written Opinion; dated Jun. 21, 2018; 16 pages.
International Patent Application No. PCT/US2018/013920; Int'l Search Report and the Written Opinion; dated Jun. 21, 2018; 16 pages.

* cited by examiner

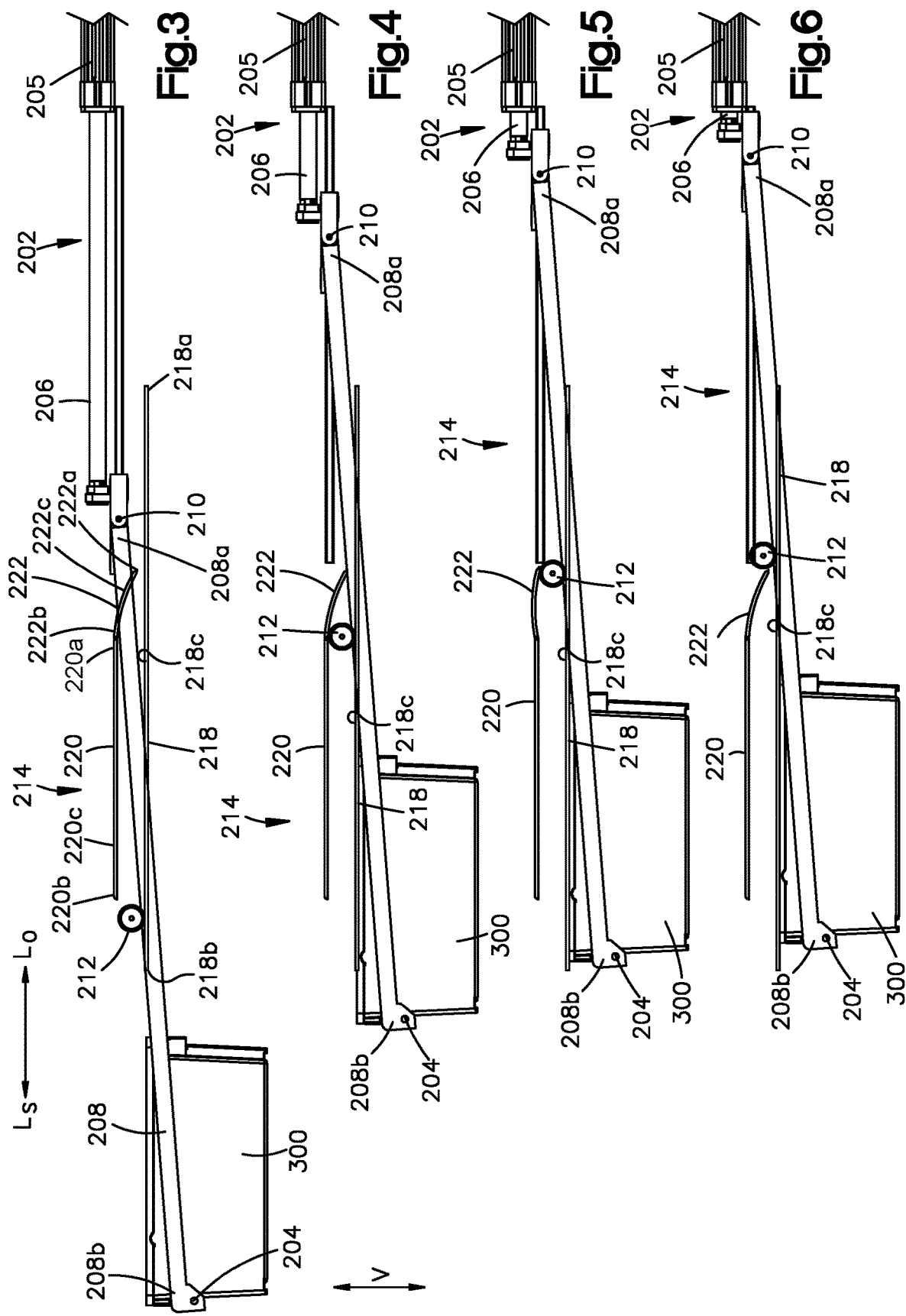

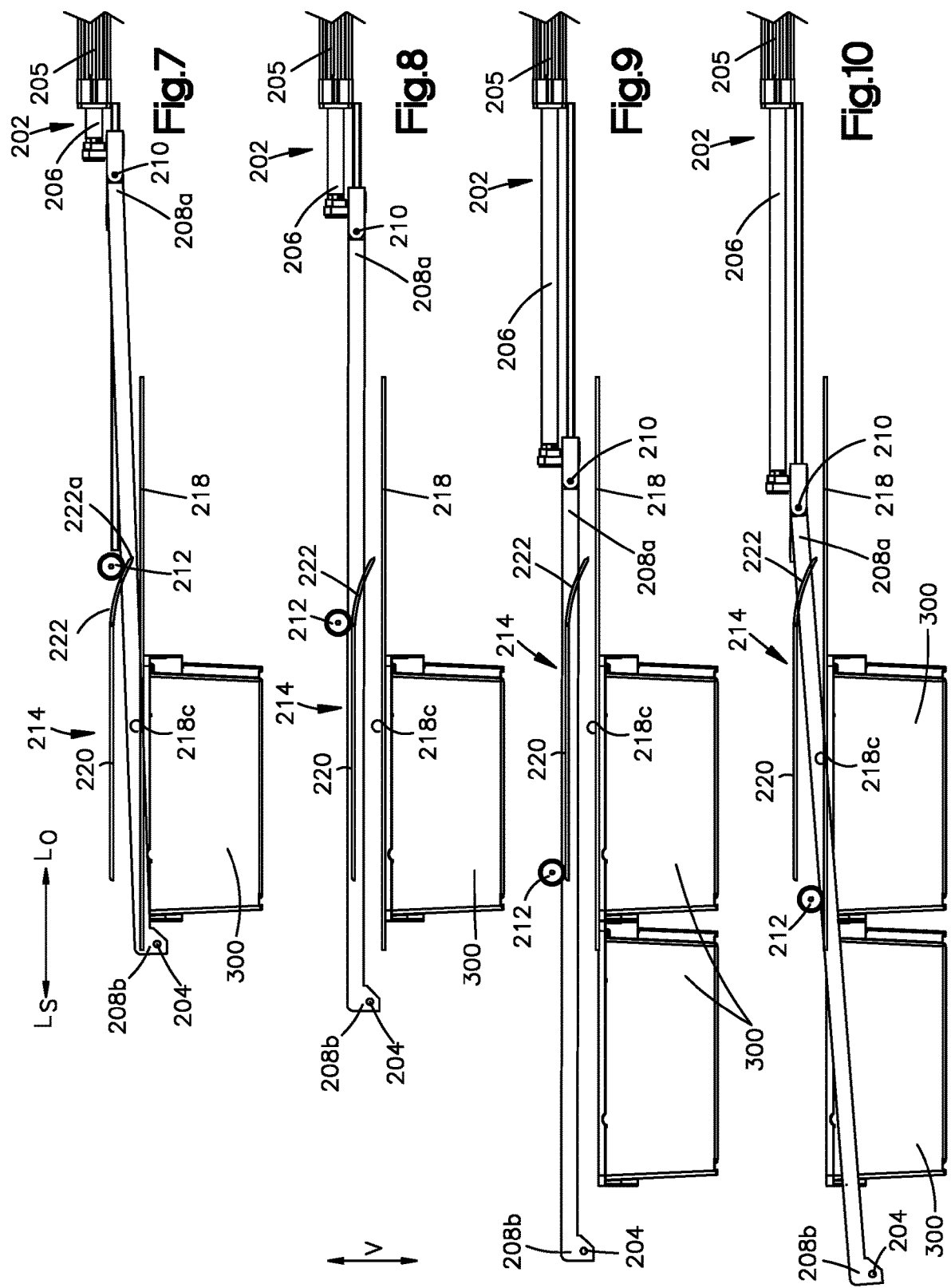

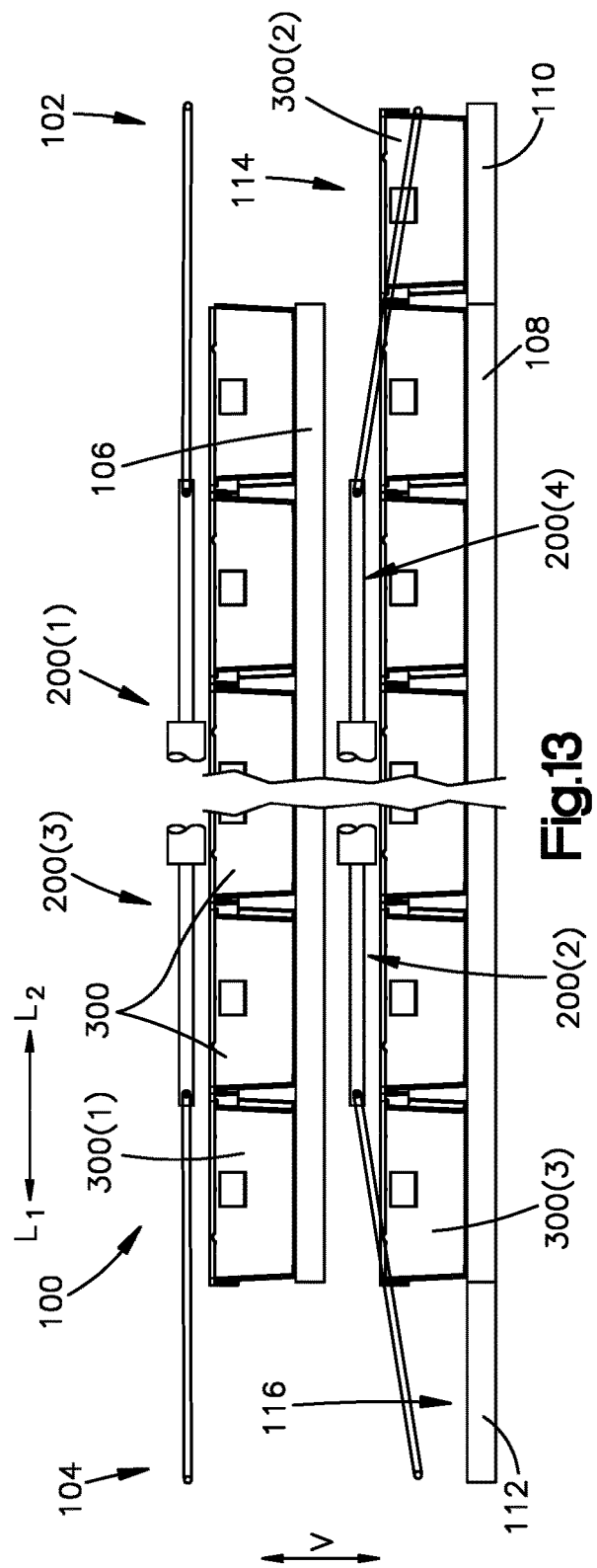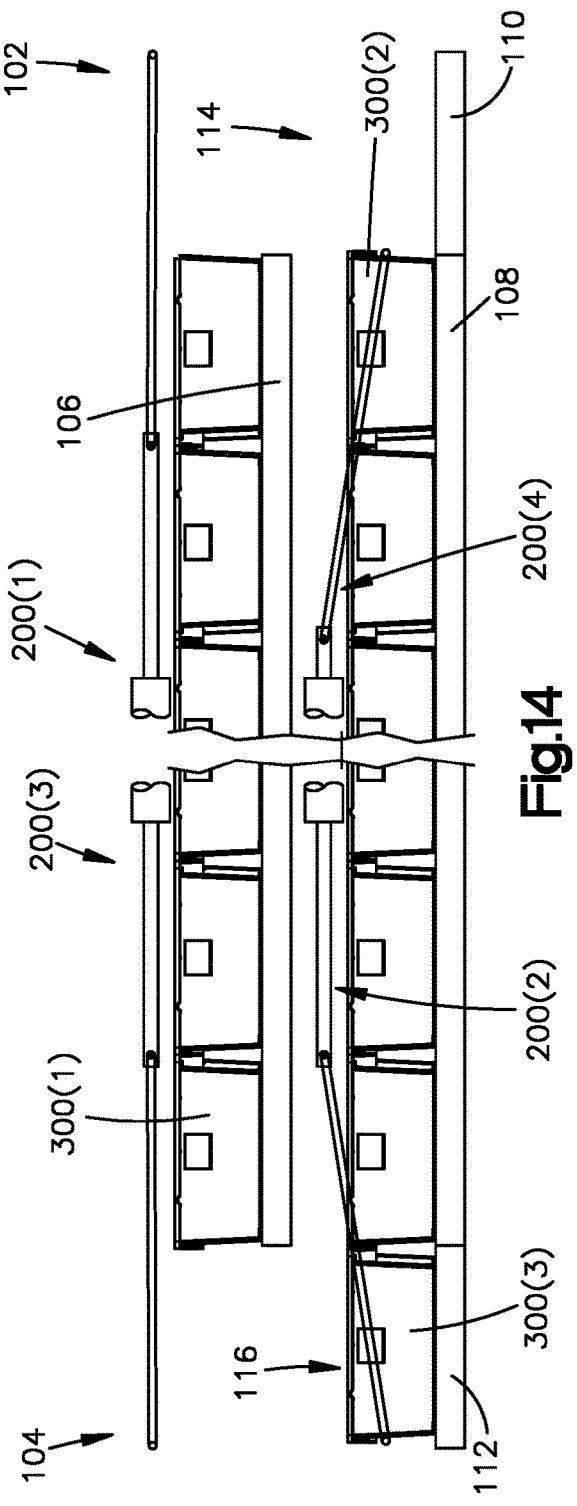

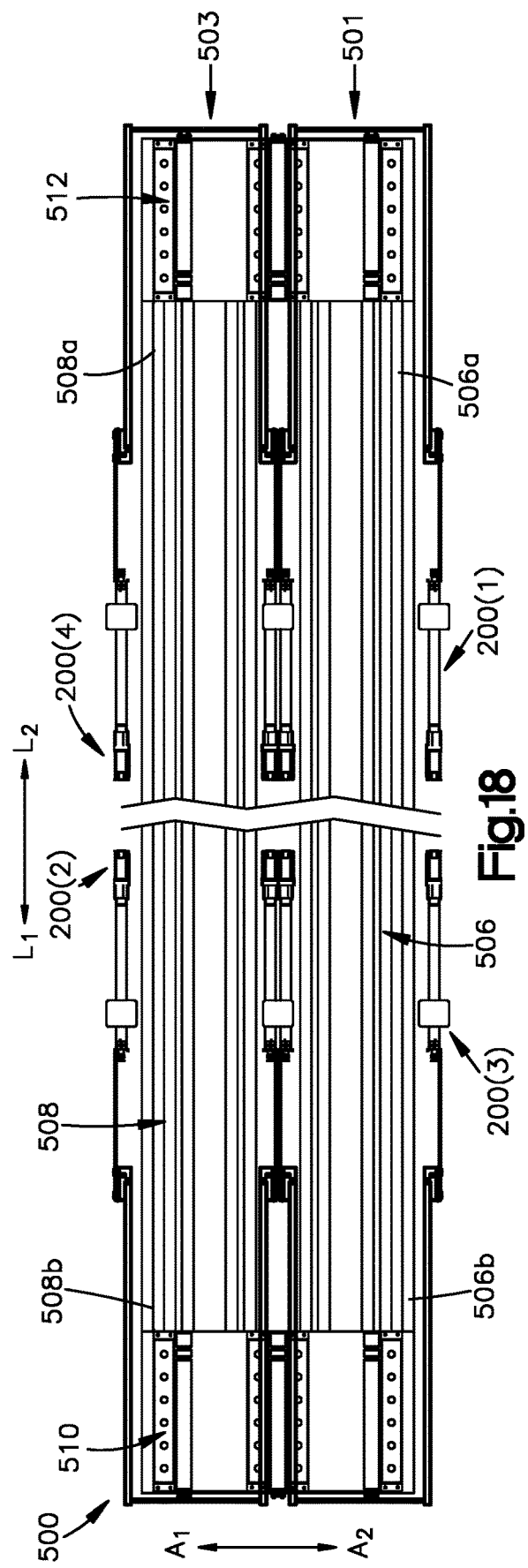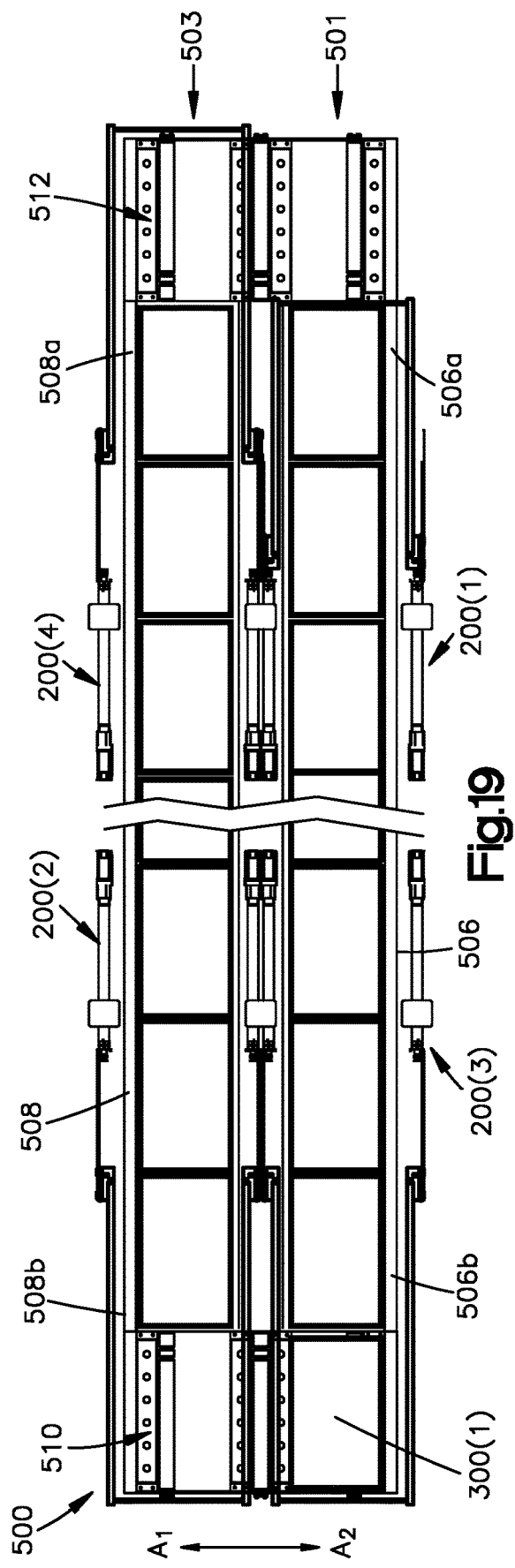

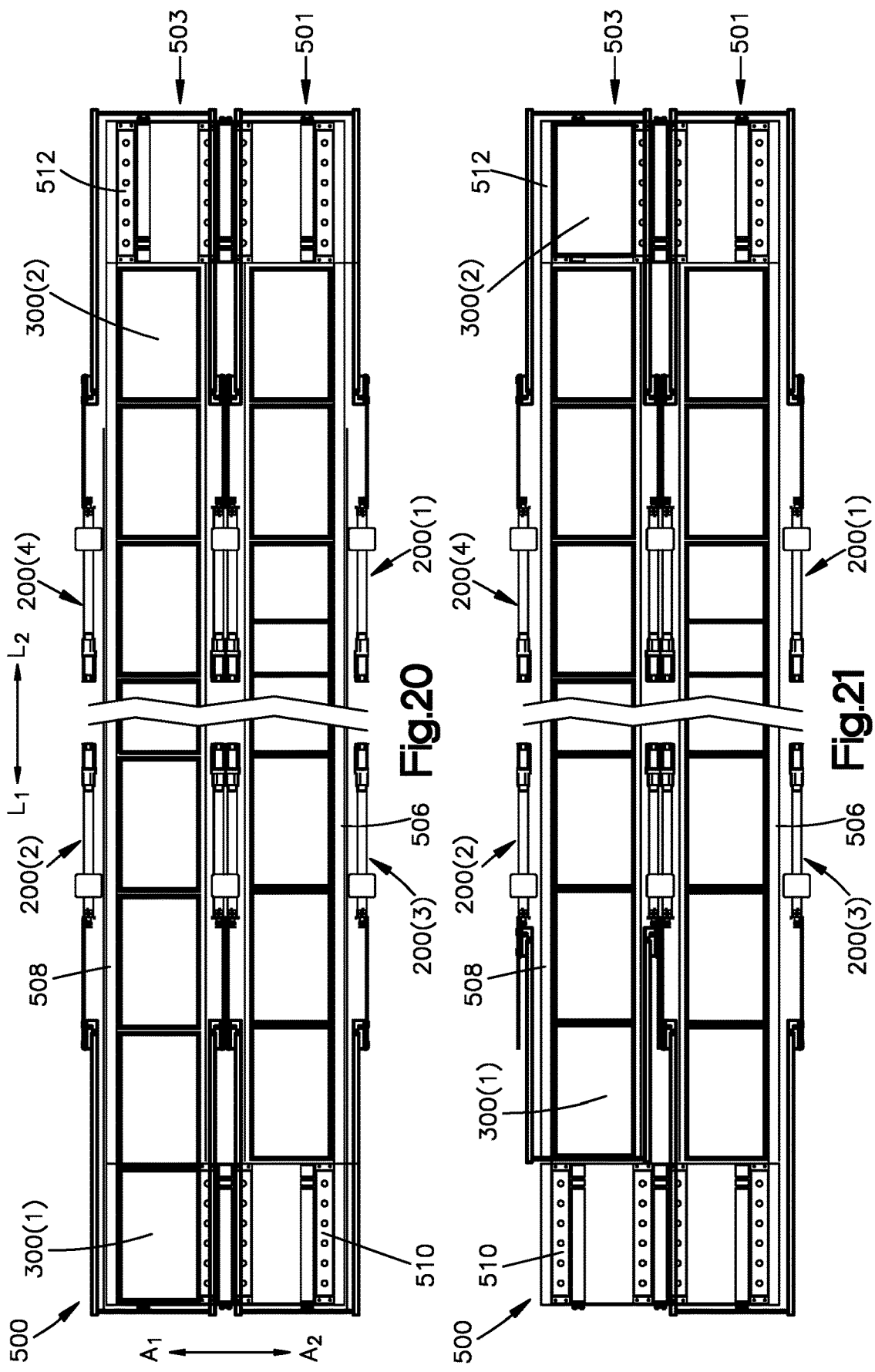

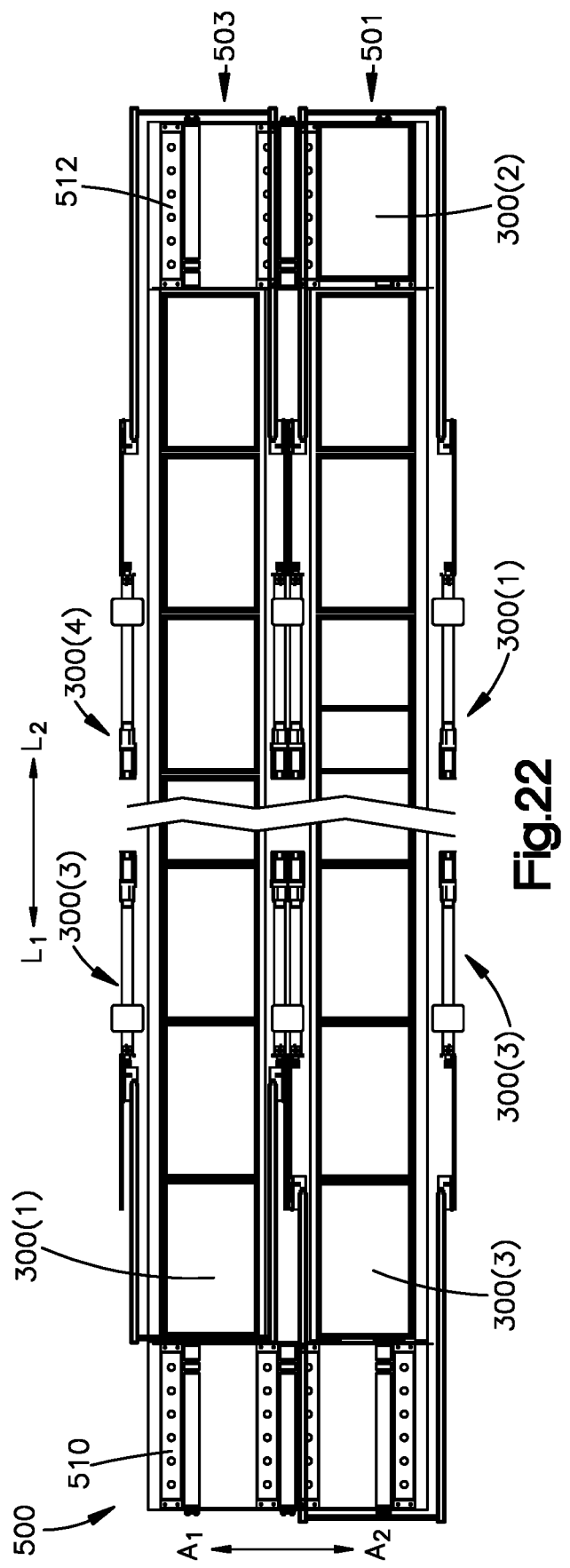

INVENTORY STORAGE MODULE HAVING ACTUATORS THAT MOVE STORAGE TOTES AROUND A CONVEYOR LOOP

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a side elevation view of an actuator assembly of FIGS. 1 and 2 in a first position;

FIG. 4 shows a side elevation view of an actuator assembly of FIGS. 1 and 2 in a second position;

FIG. 5 shows a side elevation view of an actuator assembly of FIGS. 1 and 2 in a third position;

FIG. 6 shows a side elevation view of an actuator assembly of FIGS. 1 and 2 in a fourth position;

FIG. 7 shows a side elevation view of an actuator assembly of FIGS. 1 and 2 in a fifth position;

FIG. 8 shows a side elevation view of an actuator assembly of FIGS. 1 and 2 in a sixth position;

FIG. 9 shows a side elevation view of an actuator assembly of FIGS. 1 and 2 in a seventh position;

FIG. 10 shows a side elevation view of an actuator assembly of FIGS. 1 and 2 in an eighth position;

FIG. 13 shows a side elevation view of the storage module of FIGS. 1 and 2 with the totes in a third rotational position;

FIG. 14 shows a side elevation view of the storage module of FIGS. 1 and 2 with the totes in a fourth rotational position;

FIG. 18 shows a top plan view of the storage module of FIG. 17;

FIG. 19 shows a side elevation view of the storage module of FIG. 17 with the totes in a first rotational position;

FIG. 20 shows a side elevation view of the storage module of FIG. 17 with the totes in a second rotational position;

FIG. 21 shows a side elevation view of the storage module of FIG. 17 with the totes in a third rotational position;

FIG. 22 shows a side elevation view of the storage module of FIG. 17 with the totes in a fourth rotational position.

DETAILED DESCRIPTION

In inventory storage facilities, storage density is an important characteristic. Packing inventory items closer together reduces the overall volume that is needed to store the inventory items. Thus, a smaller building or structure can be used to store inventory items that are packed closer together. Alternatively, in an existing storage facility, increasing density can free up warehouse space that can be used to store additional inventory items, thereby increasing the capacity of the storage facility. Presented herein are inventory storage modules and storage systems that can have a higher storage density than the conventional shelving units discussed above.

Figure 1:
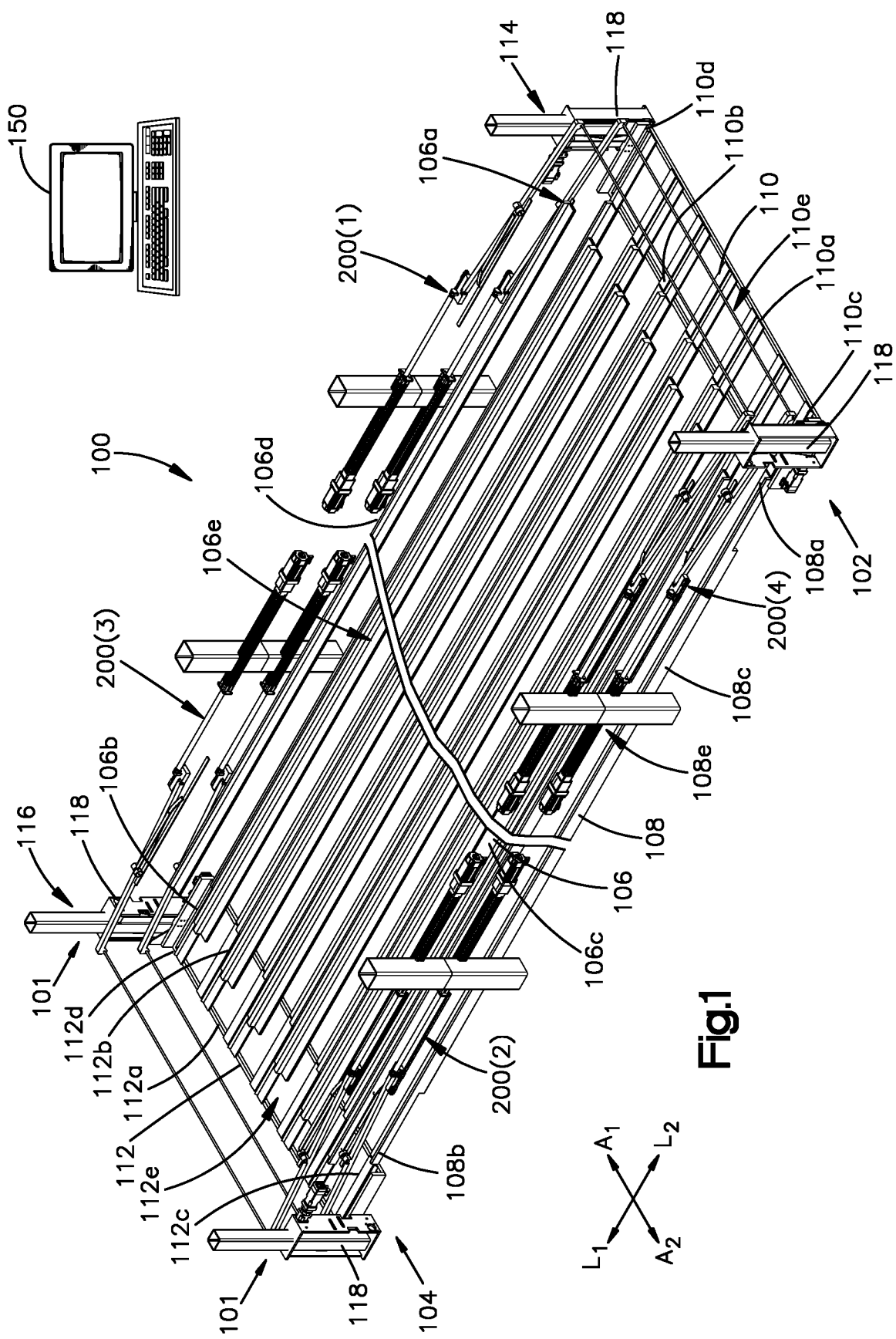
FIG. 1 shows a perspective view of a storage module according to one embodiment.
Figure 2:
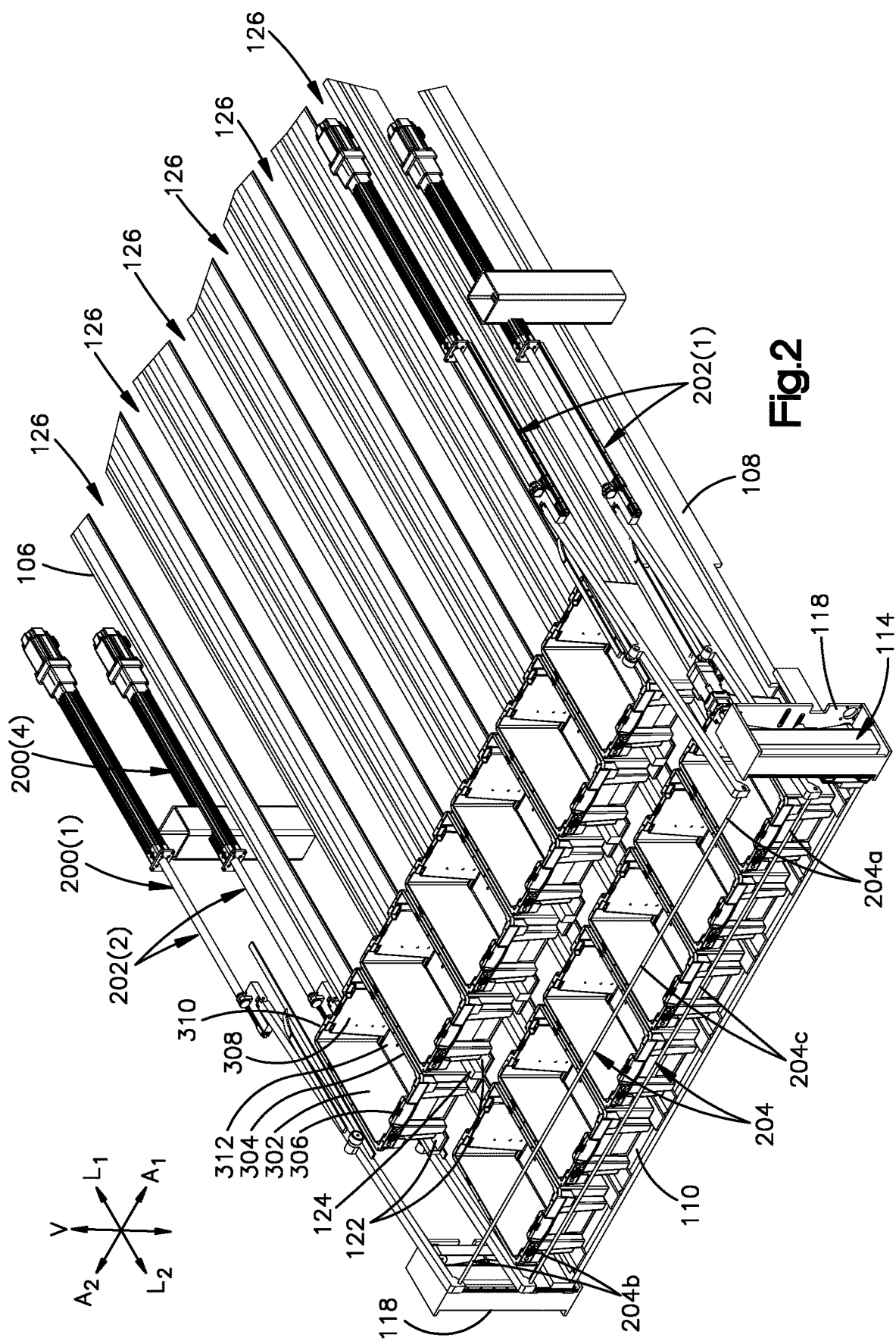
FIG. 2 shows a perspective view of a first end of the modular storage of FIG. 1 with a plurality of totes.

Referring to FIGS. 1 and 2, an inventory storage module 100 according to one embodiment is shown that is configured to store inventory items. In general, the storage module 100 has a first module end 102, and a second module end 104 spaced from the first module end 102 along a first longitudinal direction $L_1$. The storage module 100 also has a first module side 101, and a second module side 103 spaced from the first module side 101 along a first lateral direction $A_1$, perpendicular to the first longitudinal direction $L_1$. The storage module 100 can be elongate along the first longitudinal direction $L_1$. For example, the storage module 100 can have a length along the first longitudinal direction $L_1$ that is greater than a width of the storage module 100 along the first lateral direction $A_1$.

The storage module 100 is configured to support a plurality of storage totes 300. Preferably, the totes 300 are open-top containers configured to carry items in an e-commerce supply chain. The totes 300 are of a size that an individual person or robot can lift. The storage module 100 defines a conveying loop, and is configured to translate the plurality of totes 300 around the conveying loop until a desired one of the totes 300 is presented at one of the first module end 102 and the second module end 104. At such position, the desired tote 300 can be accessed by a person or machine such as a robotic arm so that an inventory item can then be placed into the desired tote 300 for storage or can be removed from the desired tote 300 to fulfill a customer order or for further transporting or processing. In this embodiment, the conveying loop is in a vertical plane; however, in alternative embodiments the conveying loop can be in a horizontal plane as discussed below in relation to FIGS. 17-23.

The storage module 100 comprises a plurality of conveyor segments, such as first to fourth conveyor segments 106, 108, 110, and 112. The first conveyor segment 106 and the second conveyor segment 108 are configured to convey a plurality of storage totes 300 (which may also be referred to as containers or bins) between the first and second module ends 102 and 104. The first and second conveyor segments 106 and 108 are spaced from one another along a vertical direction V that is perpendicular to the first longitudinal direction $L_1$ and the first lateral direction $A_1$. Thus, the first conveyor segment 106 can be considered to be an upper conveyor segment, and the second conveyor segment 108 can be considered to be a lower conveyor segment.

The third conveyor segment 110 is disposed at the first module end 102 and the second conveyor segment 112 is disposed at the second module end 104. Thus, the fourth conveyor segment 112 is offset from the third conveyor segment 110 along the first longitudinal direction $L_1$. The third and fourth conveyor segments 110 and 112 are movable between raised and lowered positions so as to transfer the totes 300 between the first and second conveyor segments 106 and 108. For example, the storage module 100 can include first and second vertical lifts 114 and 116 that include the third and fourth conveyor segments 110 and 112, respectively.

The storage module 100 includes a plurality of actuator assemblies that are configured to engage the sides or ends of the totes 300 and push the totes 300 along the first and second conveyor segments 106 and 108. For instance, the storage module 100 includes a first actuator assembly 200(1) disposed adjacent the first module end 102 and a second actuator assembly 200(1) disposed adjacent the second module end 104. The first actuator assembly 200(1) can be configured to push the totes 300 along the first conveyor segment 106 in the first longitudinal direction $L_1$, and the second actuator assembly 200(2) can be configured to push the totes 300 along the second conveyor segment 108 in a second longitudinal direction $L_2$, opposite the first longitudinal direction $L_1$. Additionally or alternatively, the storage module 100 can include a third actuator assembly 200(3) disposed adjacent the second module end 104, and a fourth actuator assembly 200(4) disposed adjacent the first module end 102. The third actuator assembly 200(3) can be configured to push the totes 300 along the first conveyor segment 106 in the second longitudinal direction $L_2$. The fourth actuator assembly 200(4) can be configured to push the totes 300 along the second conveyor segment 108 in the first longitudinal direction $L_1$.

The actuator assemblies 200(1), 200(2), 200(3), and 200(4), conveyor segments 106 and 108, and the vertical lifts 114 and 116 operate together to translate the totes 300 around the conveying loop until a desired one of the totes 300 is presented at one of the first module end 102 and the second module end 104. In some embodiments, storage module 100 can be configured to operate in a unidirectional manner such the totes 300 can be moved in only a first direction (that is, clockwise or counterclockwise) around the conveying loop. Alternatively, the storage module 100 can be configured to operate in a bidirectional manner such the totes 300 can be selectively rotated in one of the first direction and a second direction, opposite the first direction. The movement and positioning of totes 300 can be controlled by a controller 150, which can be in wired or wireless communication with the segments of the storage module. The controller 150 can control the speed and optionally the direction in which the totes are translated. Further, the controller 150 can stop translation of the totes when a desired tote is presented at one of the first and second ends 102 and 104.

Referring now more specifically to the details of the storage module 100, the first conveyor segment 106 has a first longitudinal end 106a, and a second longitudinal end 106b that is offset from the first longitudinal end 106a along the first longitudinal direction $L_1$. The first conveyor segment 106 is elongate from the first longitudinal end 106a to the second longitudinal end 106b. The first conveyor segment 106 has a first lateral side 106c and a second lateral side 106d spaced from the first lateral side 106c along the first lateral direction $A_1$, perpendicular to the first longitudinal direction $L_1$. The first conveyor segment 106 further has at least a one conveyor surface 106e (herein referred to as a first conveyor surface) that extends between the first and second longitudinal ends 106a and 106b and between the first and second lateral sides 106c and 106d.

The first conveyor segment 106 is configured to translate totes 300 along the first conveyor surface 106e from the first longitudinal end 106a to the second longitudinal end 106b along the first longitudinal direction $L_1$ when the conveyor segments operate in a counterclockwise direction as viewed looking in the first lateral direction $A_1$. Additionally or alternatively, the first conveyor segment 106 is configured to translate totes 300 along the conveyor surface 106e from the second end 106b to the first end 106a along a second longitudinal direction $L_2$, opposite the first longitudinal direction $L_1$, when the conveyor segments operate in a clockwise direction as viewed looking in the first lateral direction $A_1$.

Similarly, the second conveyor segment 108 has a first longitudinal end 108a, and a second longitudinal end 108b that is offset from the first longitudinal end 108a along the first longitudinal direction $L_1$. The second conveyor segment 108 is elongate from the first longitudinal end 108a to the second longitudinal end 108b. The second conveyor segment 108 has a first lateral side 108c and a second lateral side 108d spaced from the first lateral side 108c along the first lateral direction $A_1$. The second conveyor segment 108 further has at least one conveyor surface 108e (herein referred to as a second conveyor surface) that extends between the first and second longitudinal ends 108a and 108b and between the first and second lateral sides 108c and 108d.

The second conveyor segment 108 is configured to translate totes 300 along the second conveyor surface 108e from the second end 108b to the first end 108a along the second longitudinal direction $L_2$ when the conveyor segments operate in a counterclockwise direction as viewed looking in the first lateral direction $A_1$. Additionally or alternatively, the second conveyor segment 108 is configured to translate totes 300 along the second conveyor surface 108e from the first end 108a to the second end 108b along the first longitudinal direction $L_1$ when the conveyor segments operate in a clockwise direction as viewed looking in the first lateral direction $A_1$. The second conveyor segment 108 is offset from the first conveyor segment 106 along the vertical direction V.

The third conveyor segment 110 has a first or outer longitudinal end 110a, and a second or inner longitudinal end 110b that is offset from the first longitudinal end 110a along the first longitudinal direction $L_1$. The third conveyor segment 110 has a first lateral side 110c, and a second lateral side 110d that is offset from the first lateral side 110a along first lateral direction $A_1$. The third conveyor segment 110 includes a conveyor surface 110e that extends between the first and second longitudinal ends 110a and 110b and between the first and second lateral sides 110c and 110d. The third conveyor segment 110 is configured such that totes 300 can be translated along the conveyor surface 110e along the first longitudinal direction $L_1$ so as to move the totes 300 from the conveyor surface 110e to one of the first and second conveyor segments 106 and 108. Further, the third conveyor segment 110 is configured such that totes can be translated along the conveyor surface 110e along the second longitudinal direction $L_2$ so as to move the totes 300 from one of the first and second conveyor segments 106 and 108 onto the conveyor surface 110e.

The fourth conveyor segment 112 has a first or outer longitudinal end 112a, and a second or inner longitudinal end 112b that is offset from the first longitudinal end 112a along the first longitudinal direction $L_1$. The fourth conveyor segment 112 has a first lateral side 112c, and a second lateral side 112d that is offset from the first lateral side 112a along first lateral direction $A_1$. The fourth conveyor segment 112 includes a conveyor surface 112e that extends between the first and second longitudinal ends 112a and 112b and between the first and second lateral sides 112c and 112d. The fourth conveyor segment 112 is configured such that totes 300 can be translated along the conveyor surface 112e along the second longitudinal direction $L_2$ so as to move the totes 300 from the conveyor surface 112e to one of the first and second conveyor segments 106 and 108. Further, the fourth conveyor segment 112 is configured such that totes can be translated along the conveyor surface 112e along the first longitudinal direction $L_1$ so as to move the totes 300 from one of the first and second conveyor segments 106 and 108 onto the conveyor surface 112e.

In general, the conveyor segments 106, 108, 110, and 112 can be implemented using any suitable type of conveyor technology or any combination of suitable technologies. For example, each conveyor segment of the present disclosure can include at least one sliding surface. In the embodiment shown in FIG. 2, the conveyor segments each include a plurality of sliding surfaces 122 that are spaced from one another along the first lateral direction $A_1$, although each conveyor segment could be implemented with a single sliding surface. Each conveyor segment includes a plurality of dividers 124, each extending from one of the sliding surfaces 122. The storage module 100 defines a plurality of conveying tracks 126, each conveying track being defined between a pair of adjacent dividers 124. The adjacent dividers 124 in each pair are spaced from one another along the first lateral direction $A_1$ by a distance that is greater than an outer dimension of the totes 300 along the first lateral direction $A_1$. Thus, each track 126 is configured to support a linear array of the totes 300, wherein the totes 300 are arranged end-to-end along the first longitudinal direction $L_1$. It will be understood that, in alternative embodiments, the storage module 100 can be implemented with as few as one track 126 or any other suitable number of tracks 126.

As another example, conveyor segments of the present disclosure can include at least one rotating conveyor element in addition to, or alternatively to, the at least one sliding surface. The at least one rotating conveyor element can include at least one powered rotating conveyor element that is configured to rotate in a direction that drives the totes 300 to translate along a respective one of the conveyor surfaces. The at least one powered rotating conveyor element can include (without limitation) (i) a motor-driven roller that is driven by a motor that is disposed within the roller such as those made by Interroll, (ii) a chain- or belt-driven roller that is driven by a chain or belt that is in turn driven by a motor that is external to the roller, (iii) a conveyor belt or wire-mesh belt, (iv) any other suitable powered rotating conveyor element, or (v) any combination thereof. The at least one powered rotating conveyor element can extend across only a portion of a conveyor segment such as (without limitation) adjacent an end of the conveyor segment, or can extend across an entire length of a conveyor segment. For example, a conveyor belt or wire-mesh belt can extend adjacent an end of the conveyor segment or can extend across an entire length of a conveyor segment. Similarly, one or more rollers can be disposed adjacent one end of the conveyor segment, or a plurality of rollers can be disposed across an entire length of the conveyor segment.

Additionally or alternatively, the at least one rotating conveyor element can include at least one unpowered rotating conveyor element that rotates in response to an item being translated thereon. The at least one unpowered rotating conveyor element can include (i) a ball, (ii) a roller, (iii) a skate wheel, (iv) any other suitable rotating conveyor element that is configured to roll in response to an tote being translated thereon, or (v) any combination thereof. The at least one powered rotating conveyor element can extend across only a portion of a conveyor segment such as (without limitation) adjacent a middle portion of the conveyor segment, or can extend across an entire length of a conveyor segment.

Each tote 300 can be any suitable storage container configured to be supported by the storage module 100 and to hold items. For example, each tote 300 can be a rectangular structure, such as a bin or box, formed from a rigid material such as plastic, wood, aluminum, cardboard, or other suitable material. Each tote 300 can have a first sidewall 302, and a second sidewall 304 that is spaced from third first sidewall 302 along the first lateral direction $A_1$. Each tote 300 can have a first end wall 306, and a second end wall 308 that is spaced from the first end wall 306 along the first longitudinal direction $L_1$. Each tote 300 can further an upper end 310 and a bottom surface 312 spaced from one another along a vertical direction V. The bottom surface 312 can extend between the opposed sidewalls 302 and 304 and between the opposed end walls 306 and 308. The upper end 310 can be open for ease of access in placing inventory items into, and retrieving inventory items from, the storage container 300. Each tote 300 can have an overall carrier width $W_S$ along the first lateral direction $A_1$, an overall carrier height $H_S$ along the vertical direction V, and an overall carrier length $L_S$ along the first longitudinal direction $L_1$. In some embodiments, the overall length $L_S$ can be greater than at least one of the overall width $W_S$ and the overall height $H_S$. In other embodiments, the totes 300 can be alternatively sized. For example, in some other embodiments, the overall width $W_S$ can be greater than at least one of the overall length $L_S$ and the overall height $H_S$.

The totes 300 can be densely packed along the first and second conveyor segments 106 and 108. For example, the totes 300 carried by the first conveyor segment 106 can be arranged end-to-end such that there is little to no space between adjacent ones of the totes 300. Similarly, the totes 300 carried by the second conveyor segment 108 can be arranged end-to-end such that there is little to no space between adjacent ones of the totes 300. In some embodiments, totes 300 along each conveyor segment may contact one another other. In other embodiments, totes 300 may be spaced from each other by a distance that is no more than 10 percent of the overall length $L_S$ of each tote 300 along the conveyor segment or no more than 5 percent of the overall length $L_S$ of each tote 300 along the conveyor segment. In some embodiments, the storage module 100 can be configured such that each of at least one of the totes 300 may have one or more tote 300 stacked on top of the tote 300. Stacking the totes 300 on top of one another can increase the storage density of the storage module 100 over that of storage modules in which the totes are not stacked.

The totes 300 can also be densely packed along the vertical direction. In particular, the first conveyor segment 106 can be stacked above the totes 300 on the second conveyor segment 108 (or the bottom level) so that the space between each tote 300 on the bottom level and the first conveyor segment 106 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the totes, such as a spacing that is no more than 20 percent of the height of the tote, such as no more than 15 percent of the height of the tote, such as no more than 10 percent of the height of the tote, or such as no more than 5 percent of the height of the tote. Storage density is inversely proportional to the distance between an tote and the conveyor segment 106 immediate over top of the tote 300. Thus, as this distance is decreased, the storage density increases.

The storage module 100 can have an overall module width $W_M$ along the first lateral direction $A_1$ from the first side 101 to the second side 103. The overall module width $W_M$ can be greater than or equal to the carrier width $W_S$ such that the storage module 100 is configured to support at least one tote 300 from the first side 101 to the second side 103. As shown in FIG. 2, in some embodiments, the storage module 100 can have an overall module width $W_M$ that is greater than the carrier width $W_S$ such that the storage module 100 is configured to support a plurality of totes 300 side-by-side between the first side 101 and the second side 103. In such embodiments, the totes 300 can be densely packed from the first side 101 to the second side 103. For example, the totes 300 carried by the first conveyor segment 106 can be arranged side-to-side such that there is little to no space between adjacent ones of the totes 300. Similarly, the totes 300 carried by the second conveyor segment 108 can be arranged side-to-side such that there is little to no space between adjacent ones of the totes 300. In some embodiments, the totes 300 that are arranged side-to-side may contact one another other. In other embodiments, the totes 300 that are arranged side-to-side may be spaced from each other by a distance that is no more than 10 percent of the overall width $W_S$ of each tote 300 or no more than 5 percent of the overall width $W_S$ of each tote 300.

The first vertical lift 114 is configured to transfer totes 300 between the first end 106a of the first conveyor segment 106 and the first end 108a of the second conveyor segment 108. For instance, the first vertical lift 114 transfers totes 300 from the first end 106a of the first conveyor segment 106 to the first end 108a of the second conveyor segment 108 when the storage module 100 operates in the clockwise direction, and from the first end 108a of the second conveyor segment 108 to the first end 106a of the first conveyor segment 106 when the storage module 100 operates in the counterclockwise direction. Similarly, the second vertical lift 116 is configured to transfer totes 300 between the second end 106b of the first conveyor segment 106 and the second end 108b of the second conveyor segment 108. For instance, the second vertical lift 116 transfers totes 300 from the second end 106b of the first conveyor segment 106 to the second end 108b of the second conveyor segment 108 when the storage module 100 operates in the counterclockwise direction, and from the second end 108b of the second conveyor segment 108 to the second end 106b of the first conveyor segment 106 when the storage module 100 operates in the clockwise direction.

The first vertical lift 114 can include the third conveyor segment 110 and a first pair of linear actuators 118 that are spaced from one another along the lateral direction A. A first one of the linear actuators 118 in the first pair can support the third conveyor segment 110 at the first module side 101, and a second one of the linear actuators 118 in the first pair can support the third conveyor segment 110 at the second module side 103. The linear actuators 118 of the first vertical lift 114 can be configured to move the third conveyor segment 110 vertically between the raised position and the lowered position. In the raised position, the third conveyor segment 110 can be vertically aligned with the first conveyor segment 106, and in the lowered position, the third conveyor segment 110 can be vertically aligned with the second conveyor segment 108. It will be understood that the first vertical lift 114 can be implemented in a manner different from that shown. For example, the first vertical lift 114 can be implemented in a manner similar to the vertical lift 200 in U.S. patent application number U.S. patent application Ser. No. 15/797,562, filed on Oct. 30, 2017, the teachings of which are hereby incorporated by reference as if set forth in their entirety herein.

The second vertical lift 116 can include the fourth conveyor segment 112 and a second pair of linear actuators 118 that are spaced from one another along the lateral direction A. A first one of the linear actuators 118 in the second pair can support the fourth conveyor segment 112 at the first module side 101, and a second one of the linear actuators 118 in the second pair can support the fourth conveyor segment 112 at the second module side 103. The linear actuators 118 of the second vertical lift 116 can be configured to move the fourth conveyor segment 112 vertically between the raised position and the lowered position. In the raised position, the fourth conveyor segment 112 can be vertically aligned with the first conveyor segment 106, and in the lowered position, the fourth conveyor segment 112 can be vertically aligned with the second conveyor segment 108. It will be understood that the second vertical lift 116 can be implemented in a manner different from that shown. For example, the second vertical lift 116 can be implemented in a manner similar to the vertical lift 200 in U.S. patent application Ser. No. 15/797,562.

The first and third actuator assemblies 200(1) and 200(3) can be operatively associated with the first conveyor segment 106, and the second and fourth actuator assemblies 200(2) and 200(3) can be operatively associated with the second conveyor segment 108. Each actuator assembly 200(1) to 200(4) can be configured to apply a force to the totes 300 that is sufficient to move the totes 300 along one of the first and second conveyor segments 106 and 108. For example, when the storage module 100 operates in the counterclockwise direction, the first actuator assembly 200(1) can be configured to apply a first force to the totes 300 that moves the totes 300 along the first conveyor segment 106 in the first longitudinal direction $L_1$, and the second actuator assembly 200(2) can be configured to apply a force to the totes 300 that moves the totes 300 along the second conveyor segment 108 in the second longitudinal direction $L_2$. Similarly, when the storage module 100 operates in the clockwise direction, the third actuator assembly 200(3) can be configured to apply a force to the totes 300 that moves the totes 300 along the first conveyor segment 106 in the second longitudinal direction $L_2$, and the fourth actuator assembly 200(4) can be configured to apply a force to the totes 300 that moves the totes 300 along the second conveyor segment 108 in the first longitudinal direction $L_1$.

The inventory items stored in the totes 300 can vary from one tote 300 to the next. As a result, the totes 300 can have different weights. This difference in weight, in turn, can result in some totes 300 moving along the first and second conveyor segments 106 and 108 at a speed that is different from that of other totes 300 such that the totes 300 can separate from one another along the first and second conveyor segments 106 and 108. To limit this separation, each actuator assembly 200(1) to 200(4) can additionally or alternatively be configured to apply a counterforce to the totes 300 that opposes the motion of the totes 300. The counterforce can be insufficient to stop motion of the totes 300, but can be sufficient to limit separation of the totes 300 as the totes 300 are moved along one of the first and second conveyor segments 106 and 108 (i.e., to maintain the totes 300 in contact with one another). When configured in such a manner, an actuator assembly can be considered to be an opposing actuator assembly. It will be understood that an actuator assembly 200 of the disclosure can be used to apply a counterforce that opposes motion of the totes 300, where the motion is caused by one of the actuator assemblies 200 or a device other than one of the actuator assemblies 200 described herein. Thus, an actuator assembly 200 of the disclosure can be used to oppose the motion of totes 300 that is caused by rotating conveyor elements such as powered rollers or that is caused by an actuator that is different from those shown herein.

For example, when the storage module operates in the counterclockwise direction, the first actuator assembly 200(1) or another device such as a powered roller applies a first force to the totes 300 along the first longitudinal direction $L_1$ that moves the totes 300 along the first longitudinal direction $L_1$, and the third actuator assembly 200(3) concurrently applies a third counterforce to the totes 300 along the second longitudinal direction $L_2$, the magnitude of the third counterforce being less than that of the first force. The third counterforce limits separation between the totes 300, while still allowing the totes 300 to move along the first longitudinal direction $L_1$. Similarly, the second actuator assembly 200(2) or another device such as a powered roller applies a second force to the totes 300 along the second longitudinal direction $L_2$ that moves the totes 300 along the second longitudinal direction $L_2$, and the fourth actuator assembly 200(4) concurrently applies a fourth counterforce to the totes 300 along the first longitudinal direction $L_1$, the magnitude of the fourth counterforce being less than that of the second force. The fourth counterforce limits separation between the totes 300, while still allowing the totes 300 to move along the second longitudinal direction $L_2$.

As another example, when the storage module operates in the clockwise direction, the third actuator assembly 200(3) or other device such as a powered roller applies a third force to the totes 300 along the second longitudinal direction $L_2$ that moves the totes 300 in the second longitudinal direction $L_2$, and the first actuator assembly 200(1) applies a first counterforce to the totes 300 along the first longitudinal direction $L_1$, the magnitude of the first counterforce being less than that of the third force. The first counterforce limits separation between the totes 300, while still allowing the totes 300 to move along the second longitudinal direction $L_2$. Similarly, the fourth actuator assembly 200(4) applies a fourth force to the totes 300 in the first longitudinal direction $L_1$ that moves the totes 300 in the first longitudinal direction $L_1$, and the second actuator assembly 200(2) applies a second counterforce to the totes 300 along the second longitudinal direction $L_2$, the magnitude of the second counterforce being less than that of the fourth force. The second counterforce limits separation between the totes 300, while still allowing the totes 300 to translate along the first longitudinal direction $L_1$.

Referring more specifically to FIGS. 2 and 3, each actuator assembly 200(1) to 200(4) has at least a first actuator 202(1) and a crossbar 204 coupled to the first actuator 202(1). The first actuator 202(1) can be supported at one of the first lateral side (106a or 108a) and the second lateral side (106b or 108b) of the respective one of the first and second conveyor segments 106 and 108. The crossbar 204 can have a first crossbar end 204a coupled to the first actuator 202(1). The crossbar 204 can have a second crossbar end 204b that is spaced from the first crossbar end 204a along a direction that extends from one of the first and second lateral sides of the respective one of the first and second conveyor segments 106 and 108 to the other one of the first and second lateral sides. For example, the crossbar 204 can extend in one of the first and second longitudinal directions $L_1$ and $L_2$. The crossbar 204 can be elongate as it extends from the first crossbar end 204a to the second crossbar end 204b. The crossbar 204 can have an outer side surface 204c that extends between the first and second crossbar ends 204a and 204b. Each actuator assembly 200(1) to 200(4) is configured such that the outer side surface 204c of the crossbar 204 engages the sides or ends of the totes 300 so as to apply a force to the sides or ends of the totes 300.

In some embodiments, each actuator assembly 200(1) to 200(4) can include a second actuator 202(2) supported at the other one of the first lateral side (106a or 108a) and the second lateral side (106b or 108b) of the respective one of the first and second conveyor segments 106 and 108. The second crossbar end 204b can be coupled to the second actuator 202(2) at the other one of the first and second lateral sides. It will be understood that, in some embodiments, the crossbar 204 can be coupled to just one of the first and second actuators 202(1) and 202(2), and the other of the first and second actuators 202(1) and 202(2) can be omitted or can include its own crossbar.

Turning to FIGS. 3 to 10, a side view of an actuator assembly 200 according to one embodiment is shown. At least one, up to all, of the actuator assemblies 200(1) and 200(2) of FIGS. 1 and 2 can be implemented as shown in FIGS. 3 to 10. However, it will be understood that the actuator assemblies 200(1) to 200(4) can be implemented in alternative manners. Each actuator assembly 200(1) to 200(4) includes at least one actuator 202 and a crossbar 204 coupled to the at least one actuator 202. Each actuator 202 can include an actuator housing 205 and a piston rod 206. Each actuator 202 can be a linear actuator that is configured to extend the piston rod 206 from the actuator housing 205 along a select longitudinal direction $L_S$ and retract the piston rod 206 into the actuator housing 205 along a direction $L_O$ that is opposite the select longitudinal direction $L_S$. The select longitudinal direction $L_S$ can be the first longitudinal direction $L_1$ when implementing an actuator of the first and third actuator assemblies 200(1) and 200(3), and can be the second longitudinal direction $L_2$ when implementing an actuator of the second and fourth actuator assemblies 200(2) and 200(4).

Each actuator 202 can include a crossbar raising and lowering mechanism 214. The crossbar raising and lowering mechanism 214 is configured to raise the crossbar 204 such that the crossbar 204 is vertically offset from the upper end 310 of the totes 300. Further, the crossbar raising and lowering mechanism 214 is configured to lower the crossbar 204 such that the crossbar 204 is vertically aligned with the totes 300. FIGS. 3-10 show one example of a crossbar raising and lowering mechanism 214. It will be understood that the crossbar raising and lowering mechanism 214 can be implemented in a manner other than that shown.

Each crossbar raising and lowering mechanism 214 can include an arm 208 having a first end 208a, and a second end 208b offset from the first end 208a. The first end 208a can be pivotally coupled to the piston rod 206 at a pivot axis 210 that extends in the first lateral direction $A_1$. The second end 208b can be coupled to the crossbar 204. Each crossbar raising and lowering mechanism 214 can include a track 216 and a wheel or roller 212 that is rotationally coupled to the arm 208. The track 216 can include a lower track segment 218 having a first end 218a, a second end 218b spaced from the first end 218a along the select longitudinal direction $L_S$, and a first track surface 218c that extends from the first end 218a to the second end 218b. The track 216 can include an upper track segment 220 spaced above the lower track segment 216a along the vertical direction V. The upper track segment 220 has a first end 220a, a second end 220b spaced from the first end 220a along the select longitudinal direction $L_S$, and a second track surface 220c that extends from the first end 220a to the second end 220b. The track 216 can further include a hinged segment 222 that is pivotally coupled to the upper track segment 220. The hinged segment 222 can have a first end 222a, a second end 222b opposite the first end 222a, and a third track surface 222c that extends from the first end 222a to the second end 222b. The third track surface 222c can be sloped or curved downward towards as it extends from the second end 222b towards the first end 222a. Thus, the first end 222a can be spaced closer to the lower track segment 218 along the vertical direction V than the second end 222b. The second end 222b can be coupled pivotally coupled to the first end 220a of the upper track segment 220 at a hinge so as to allow the first end 222a to pivot up and down. The upper track segment 220 and the hinged segment 222 have a combined length along the select longitudinal direction $L_S$ that is less than a length of the lower track segment 222 along the select longitudinal direction $L_S$.

The actuator assembly 200 can be configured to operate in a driving mode in which the actuator assembly 200 moves the crossbar 204 so as to cause the crossbar 204 to engage at least one tote 300 and drive the tote 300 along one of the first and second conveyor segments 206 and 208. In so doing, the actuator assembly 200 can cause the wheel or roller 212 to translate around the track 216 in a clockwise direction when viewed along the second lateral direction $A_2$. For example, and with reference to FIGS. 3 to 6, the crossbar 204 can be in a lowered position so as to be vertically aligned with the totes 300. As the piston rod 206 retracts into the housing 205 along the opposite direction $L_O$, the arm 208 moves towards the housing 205 along the opposite direction $L_O$ causing the crossbar 204 to move along the opposite direction $L_O$. As the crossbar 204 moves along the opposite direction $L_O$, the crossbar 204 applies a force to the totes 300 in the opposite direction $L_O$ that moves the totes in the opposite direction $L_O$. Further, retraction of the piston rod 206 causes the wheel or roller 212 to roll along the surface 218c of the lower track segment 218 along the opposite direction $L_O$. As the wheel or roller 212 passes under the hinged segment 222, the wheel or roller 212 engages the hinged segment 222 thereby causing the hinged segment 222 to deflect upwards to a deflected position so as to allow the wheel or roller 212 to pass under the hinged segment 222. After the wheel or roller 212 passes under the hinged segment 222, the hinged segment 222 deflects back downwards to its undeflected position.

With reference to FIGS. 7 to 10, after the wheel or roller 212 passes under the hinged segment 222, the crossbar 204 can be raised to a raised position such that the crossbar 204 can be passed over at least one tote 300. In particular, as the piston rod 206 extends out of the housing 205 along the select longitudinal direction $L_S$, the arm 208 moves in the select longitudinal direction $L_S$ causing the wheel or roller 212 to roll along the select longitudinal direction $L_S$, up the surface 222c of the hinged segment 222, and along the surface 220c of the upper segment 220. As the arm 208 moves in the select longitudinal direction $L_S$, the crossbar 204 moves along the select longitudinal direction $L_S$ so as to pass over at least one tote 300. In FIG. 10, after the crossbar 204 passes the at least one tote 300 along the select longitudinal direction $L_S$, the wheel or roller 212 drops from the upper track 220 to the lower track 218 so as to move the arm 208 and the crossbar 204 from the raised position to the lowered position.

In some embodiments, the actuator assembly 200 can be additionally or alternatively be configured to operate in a counterforce mode in which the actuator assembly 200 applies a counterforce to the totes 300 that opposes the motion of the totes 300. As described above, the counterforce can be insufficient to stop motion of the totes 300, but can be sufficient to limit separation of the totes 300 as the totes 300 are moved along one of the first and second conveyor segments 106 and 108 (i.e., to maintain the totes 300 in contact with one another). It will be understood that, in some embodiments, such as embodiments in which the storage module 100 is configured to operate in a bidirectional manner, the actuator assembly 200 can be selectively configurable to operate in one of the driving mode and the counterforce mode depending on the direction in which the totes 300 are to be rotated, while in other embodiments, the actuator assembly 200 can be configured to operate in only one of the driving mode and the counterforce mode. In the counterforce mode, the actuator assembly 200 can be configured such that the crossbar 204 remains in the lowered position and the wheel or roller 212 translates back and forth along only the lower track segment 218. The actuator assembly 200 can include an actuator (not shown) that causes the hinged segment 222 to remain in the upwardly deflected position such that the wheel or roller 212 can translate back and forth under the hinged segment 222, without riding up the hinged segment 222.

Referring now to FIGS. 11 to 14, one method of translating the totes 300 around a vertical conveying loop of the storage module 100 in a clockwise direction will now be described. In this method, one vertical lift 114 or 116 transitions totes 300 between the first and second conveyor segments 106 and 108 of the module 100 at a time. However, it will be understood that, in alternative methods, both vertical lifts 114 and 116 could transition totes 300 between the first and second conveyor segments 106 and 108 concurrently. As the totes 300 are translated around the vertical conveying loop, the orientation of each carrier 300 remains fixed. Thus, the second end wall 308 of each carrier 300 remains spaced from the first end wall 306 of the carrier 300 along the first longitudinal direction $L_1$ as the carrier 300 is translated around the conveying loop. Similarly, the upper end 310 remains spaced above the bottom surface 312 as the carrier 300 is translated around the conveying loop. It will be understood that the carriers 300 can additionally or alternatively be translated in a counterclockwise direction.

Figure 11:
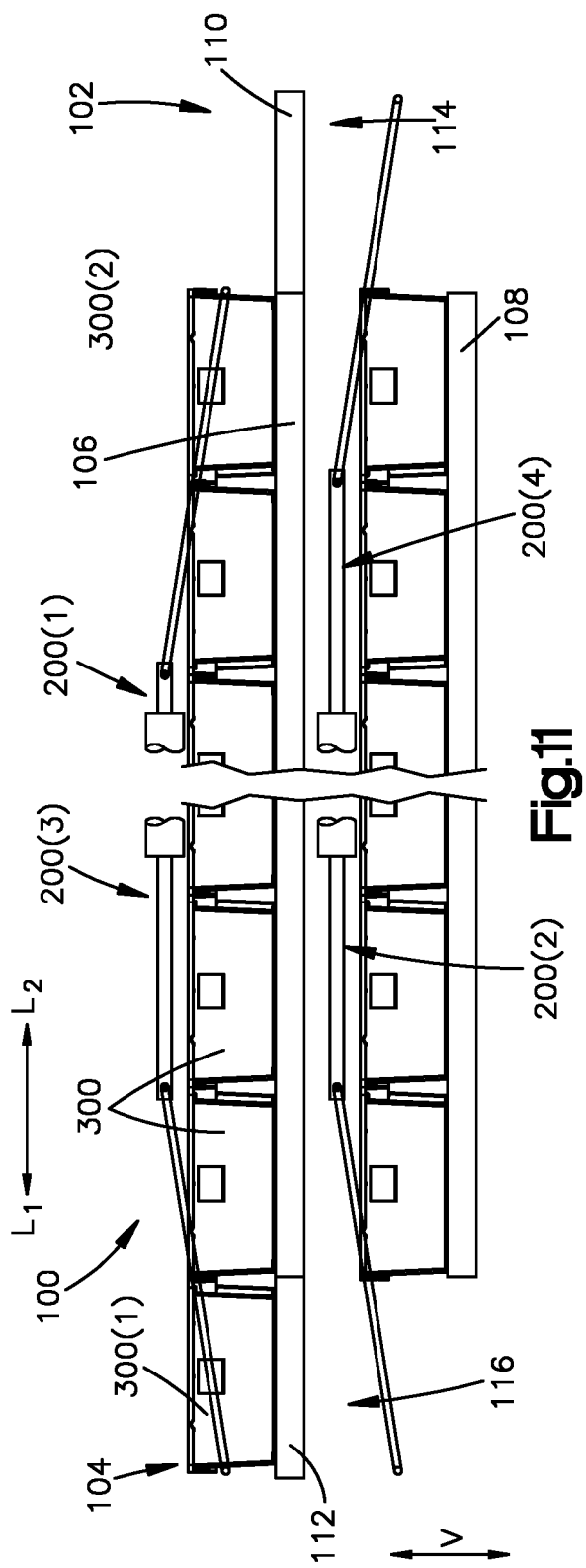
FIG. 11 shows a side elevation view of the storage module of FIGS. 1 and 2 with the totes in a first rotational position.
Figure 12:
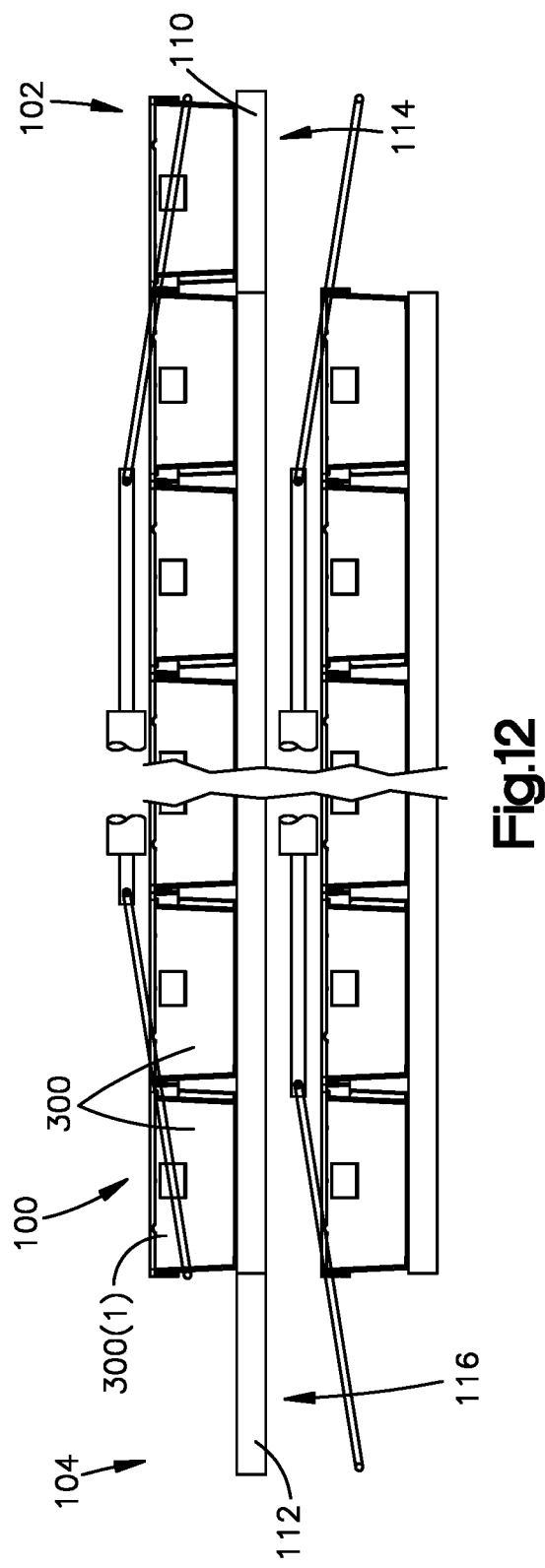
FIG. 12 shows a side elevation view of the storage module of FIGS. 1 and 2 with the totes in a second rotational position.

In FIGS. 11 to 12, a step is shown that comprises causing the totes 300 to be translated along the upper level of the storage module 100 along the second longitudinal direction $L_2$. This step can include causing a first tote 300(1) to be translated from the first conveyor segment 106 onto the third conveyor segment 110 along the second longitudinal direction $L_2$, where the third conveyor segment 110 is shown in a raised position. The third actuator assembly 200(3) engages a first tote 300(1) and pushes the tote 300(1) along the second longitudinal direction $L_2$, thereby causing the upstream totes 300 to translate along the second longitudinal direction $L_2$ until a second tote 300(2) is at least partially disposed on the third conveyor segment 110. Concurrently, the first actuator assembly 200(1) can apply a counterforce to the second tote 300(2) in the first longitudinal direction $L_1$ that limits separation of the totes 300.

In FIGS. 12 to 13, a step is shown that comprises causing the first vertical lift 200(1) and the second vertical lift 200(2) to be transitioned from their respective raised positions in FIG. 6 to their respective lowered positions. Although not shown, each vertical lift can be transitioned to an intermediate position between the raised and lowered position. An inventory item can be retrieved from, or stowed into, the second tote 300(2), or the second tote 300(2) can be removed from the storage module 100 or stowed into the second tote 300(2) in the intermediate position. However, it will be understood that, in alternative embodiments, the stowing and retrieving can be performed in any one or more of the raised position in FIG. 12, the intermediate position, and the lowered position in FIG. 13.

In FIGS. 13 to 14, a step is shown that comprises causing the totes 300 to be translated along the lower level of the storage module 100 along the first longitudinal direction $L_1$. This step can include causing the second tote 300(2) to be translated from the third conveyor segment 110 onto the second conveyor segment 108 along the first longitudinal direction $L_1$. The fourth actuator assembly 200(4) engages the second tote 300(2) and pushes the second tote 300(2) along the first longitudinal direction $L_1$, thereby causing the upstream totes 300 to translate along the first longitudinal direction $L_1$ until a third tote 300(3) is at least partially disposed on the fourth conveyor segment 112. Concurrently, the second actuator assembly 200(2) can apply a counterforce to the third tote 300(3) in the second longitudinal direction $L_2$ that limits separation of the totes 300. The method can then comprise a step (not shown) of causing the second vertical lift 116 and the first vertical lift 114 to be transitioned from their respective lowered positions in FIG. 14 to their respective raised positions as in FIG. 11 so as to move the third tote 300(3) to the upper level, and the entire method can be repeated as needed until a desired one of the totes 300 is presented at one of the first and second ends 102 and 104.

Figure 15:
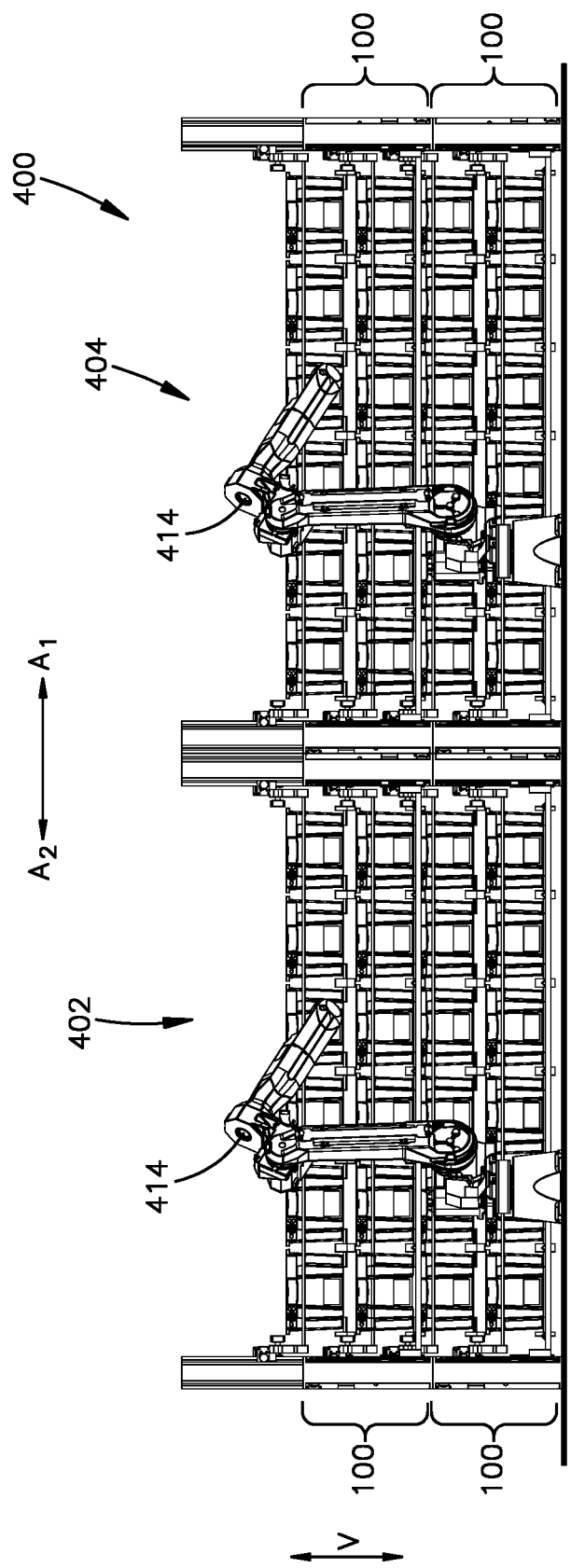
FIG. 15 shows an end elevation view of a storage and retrieval system according to one embodiment that comprises a plurality of instances of the storage module of FIG. 1 and a plurality of totes.
Figure 16:
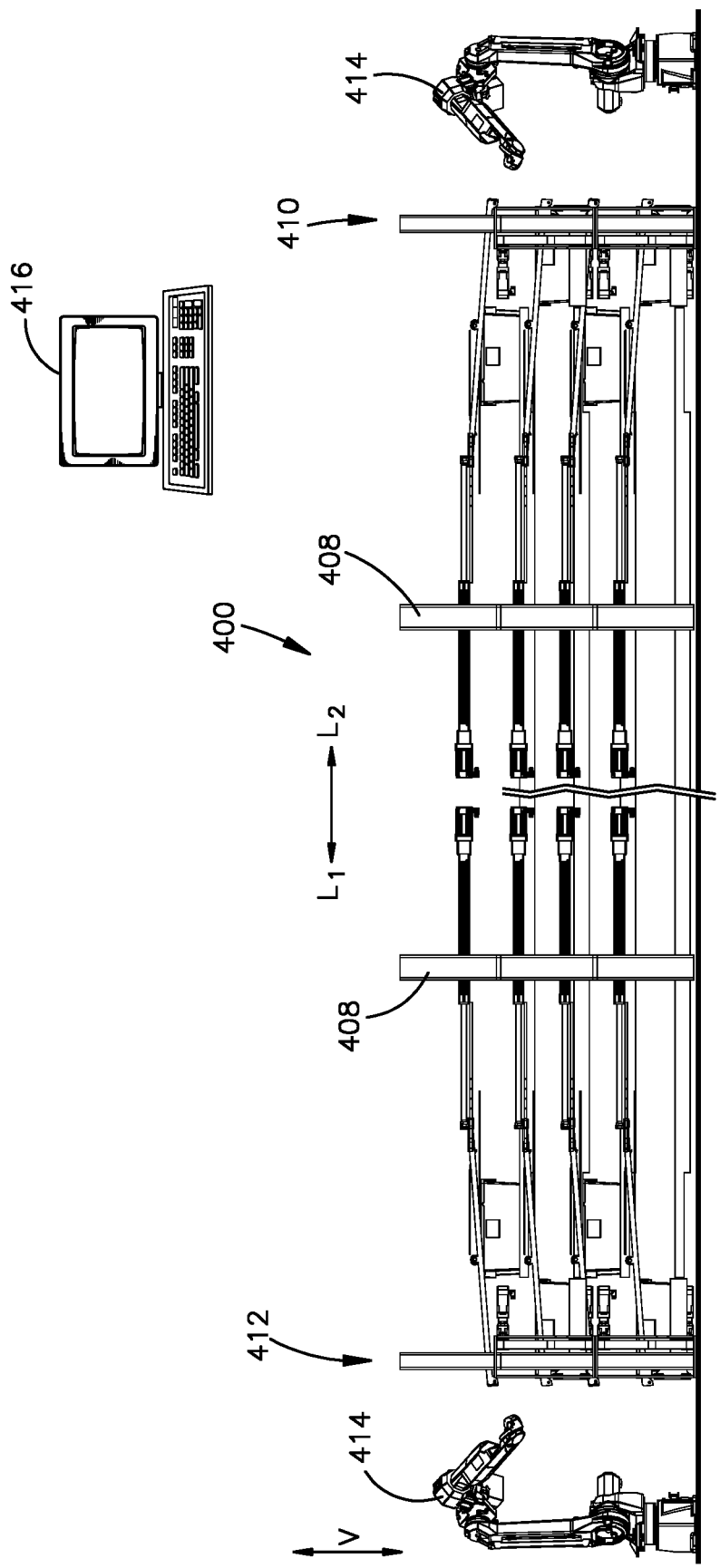
FIG. 16 shows a side elevation view of the storage and retrieval system of FIG. 15.

Referring now to FIGS. 15 and 16, a modular storage and retrieval system 400 is shown that comprises a plurality of instances of the storage module 100 of FIG. 1, each supporting a plurality of totes 300. In general, storage systems of the disclosure can include at least one vertical stack of storage modules that comprises at least two of the storage modules stacked on top of one another along the vertical direction V. In at least some embodiments, the system 400 can include the totes 300 supported by the system 400, although it will be understood that the system 400 can be made and sold without the totes 300.

The storage system 400 comprises a first system end 410, and a second system end 412 that is spaced from the first system end 410 along the first longitudinal direction $L_1$. The storage system 400 includes a plurality of instances of the storage module 100, each extending from the first system end 410 to the second system end 412. The plurality of storage modules 100 includes a first vertical stack 402 of the storage modules 100 that comprises a plurality (e.g., at least two) of the storage modules 100 stacked on top of one another along the vertical direction V. The storage system 400 further includes a second vertical stack 404 of the storage modules 100 that comprises a plurality (e.g., at least two) of the storage modules 100 stacked on top of one another along the vertical direction V. The second vertical stack 404 can be offset from the first vertical stack 402 along the first lateral direction $A_1$.

Each storage module 100 of the system 400 can be independently operated such that the totes 300 of each storage module 100 can be driven around its corresponding conveying loop independently of the totes 300 of other storage modules 100 being driven around their corresponding conveying loops. Although two vertical stacks 402 and 404, each having two storage modules 100 are shown, it will be understood that the number of vertical stacks and the number of storage modules 100 in each vertical stack can vary from that shown. In particular, modular storage and retrieval systems of the disclosure can include at least one vertical stack of storage modules 100 or more than one vertical stack of storage modules 100. Further, each vertical stack of storage modules 100 can have at least two storage modules 100 stacked on top of one another or more than two storage modules 100. Thus, height, width, and length of the system 400 can be scalable to fit within a desired volume in a warehouse space.

The modular storage and retrieval storage system 400 can include supports 408 that are coupled to the storage modules 100 in each vertical stack 402 and 404 so as to maintain the storage modules 100 in a stacked relation. The supports 408 can further be coupled to the storage modules 100 so as to attach the vertical stacks 402 and 404 of storage modules 100 to one another. The supports 408 can combine to form a frame of the system 400.

The storage modules 100 can be stacked on top of one another so that the space between each tote 300 and a storage module 100 immediately over top of the tote 300 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the totes, such as a spacing that is no more than 20 percent of the height of the tote, such as no more than 15 percent of the height of the tote, such as no more than 10 percent of the height of the tote, or such as no more than 5 percent of the height of the tote. Storage density is inversely proportional to the distance between an tote and the storage module immediate over top of the tote 300. Thus, as this distance is decreased, the storage density increases.

The modular storage and retrieval system 400 can also include at least one robotic manipulator 414. For example, the system 400 can include at least one robotic manipulator 414 that services the first module end 102 of each vertical stack of storage modules 100. The system 400 can additionally or alternatively include at least one robotic manipulator 414 that services the second module end 104 of each vertical stack of storage modules 100 as shown. In some embodiments, the manipulators 414 at the first module ends 102 can be used to stow inventory items or totes 300 in the storage modules 100, and the manipulators 414 at the second module end 104 can be used to retrieve inventory items or totes 300 from the storage modules 100. Alternative embodiments can include at least one manipulator 414 on only one end of a vertical stack, the at least one manipulator 414 configured to perform both stowing and retrieving operations. Additionally or alternatively, one or more of the robotic manipulators 414 can service multiple vertical stacks of storage modules 100. Although not shown, in some embodiments, the at least one robotic manipulator 414 can be configured to move vertically and/or horizontally to service the storage modules 100 of the system 400. For example, a robotic manipulator 414 can be mounted on a horizontal and/or vertical track to enable it to move with respect to the vertical stacks.

Each robotic manipulator 414 can be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). Each robotic manipulator 414 can include any suitable type and number of sensors disposed throughout the robotic manipulator 414 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 414, including an end effector. The sensors can be in communication with a controller 416. Note that controller 416 can implement (or be the same as) controller 150, or can be separate from controller 150. The controller 416 can be local to the robotic manipulator 414 (e.g., a robotic manipulator controller) or can be separate from, but in communication with, the robotic manipulator 414. In this manner, the controller 416 can control the operation of the robotic manipulator 414 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

Other material conveyance devices (not shown) may also be disposed adjacent to the robotic manipulators 414. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 414.

In operation, a method of operating the system 400 comprises causing a desired tote 300 in the system 400 to be identified to either retrieve an inventory item from or stow an inventory item into. Further, the method comprises causing a location of the tote 300 in the system 400 to be identified. Identifying the location can include identifying the storage module 100 that supports the identified tote 300 and optionally the position of the tote 300 on the identified storage module 100. Once the location is identified, the method comprises causing the totes 300 of the identified storage module 100 to be translated around the conveying loop of the identified storage module 100 until the desired tote 300 is presented at a desired one of the first and second ends 102 and 104 of the identified storage module 100. The method then comprises retrieving an inventory item from, or stowing an inventory item into, the desired tote 300. This step can be performed by a human who manually retrieves an inventory item from the desired tote 300 or stows the inventory item into the desired tote 300. Alternatively, this step can comprise causing a robotic manipulator 414 to move so as to retrieve an inventory item from the desired tote, or stow an inventory item into the desired tote 300. In some embodiments, the human or robotic manipulator 414 can retrieve the desired tote 300 itself from the system 400, and then the inventory item can be retrieved from the desired tote 300. The tote 300 can then be stowed by the human or a robotic manipulator 414 onto a desired one of the storage modules 100. In so doing, the tote 300 can be stowed onto the same storage module 100 from which the tote 300 was retrieved for can be stowed in a different storage module. At least one, up to all, of these steps can be controlled by the controller 416.

Figure 17:
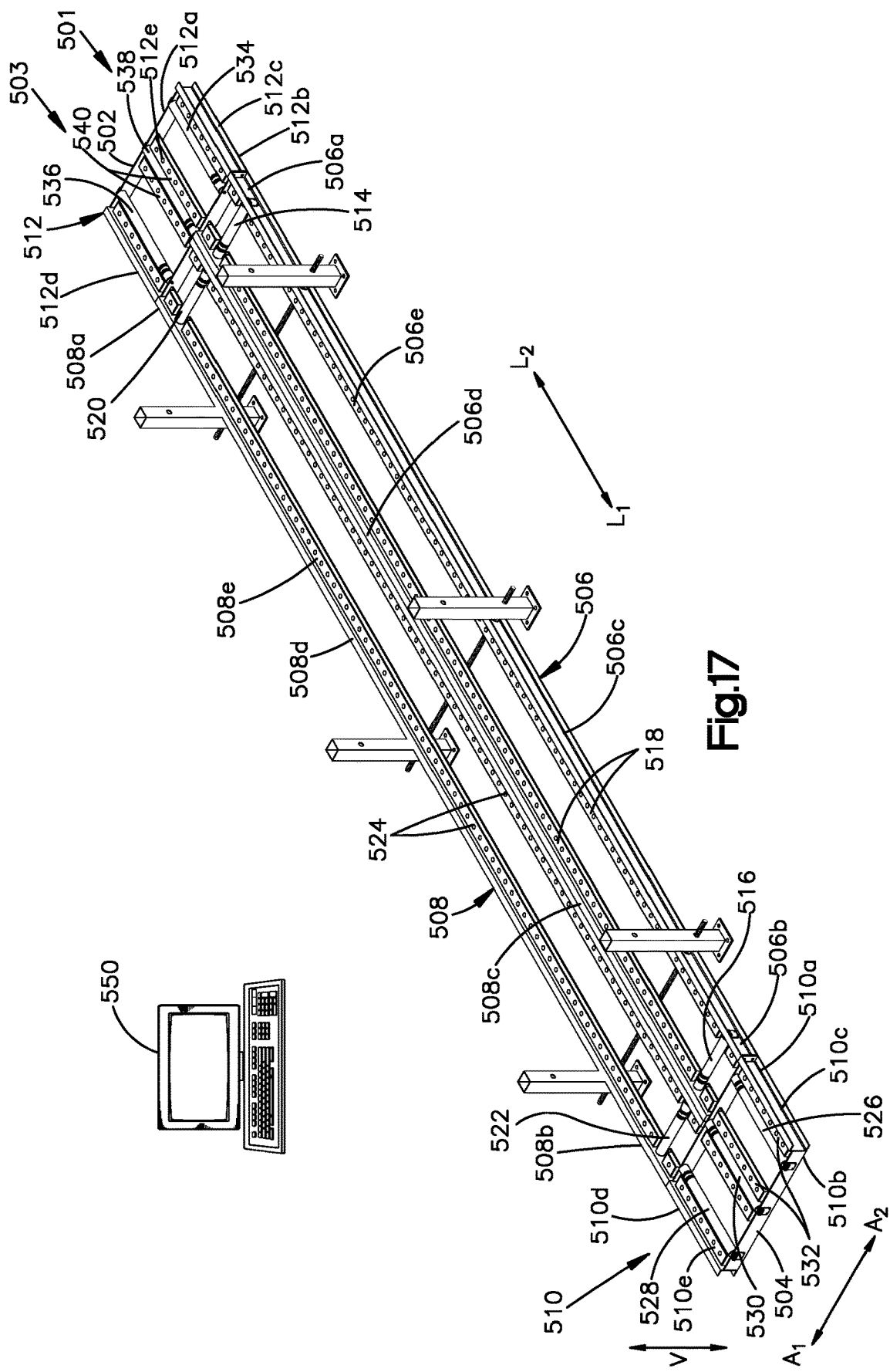
FIG. 17 shows a perspective view of a storage module according to another embodiment.

Referring to FIGS. 17 and 18, an inventory storage module 500 according to another embodiment is shown that is configured to store inventory items. The storage module 500 and systems comprising multiple instances of the storage module 500 can be configured as shown and described in U.S. patent application Ser. No. 15/721,280, filed on Sep. 29, 2017, the teachings of all of which are hereby incorporated by reference as if set forth in their entirety herein. In general, the storage module 500 is similar to the storage module 100 of FIGS. 1 and 2. However, the storage module 500 is configured to convey the totes 300 (configured as described above) around a horizontal conveying loop, rather than the vertical conveying loop of FIGS. 1 and 2. Thus, the two elongate conveyor segments 506 and 508 are side-by-side rather than one over the other, and the vertical lifts are eliminated.

The storage module 500 has a first module end 502, and a second module end 504 spaced from the first module end 502 along a first longitudinal direction $L_1$ such that the storage module 500 is elongate from the first module end 502 to the second module end 504. The storage module 500 also has a first module side 501, and a second module side 503 spaced from the first module side 501 along a first lateral direction $A_1$, perpendicular to the first longitudinal direction $L_1$. The storage module 500 comprises a plurality of conveyor segments, such as first to fourth conveyor segments 506, 508, 510, and 512, that define a horizontal conveying loop in a horizontal plane. The storage module 500 can include a plurality of actuator assemblies 200(1) to 200(4) (shown in FIG. 18 and omitted from FIG. 17 for illustrative purposes). The conveyor segments and actuator assemblies are configured to move a plurality of the totes 300 (see FIGS. 19 to 22) around the conveying loop until a desired one of the totes 300 is presented at one of the first module end 502 and the second module end 504. At such position, the desired tote 300 can be accessed by a person or machine such as a robotic arm so that an inventory item can then be placed onto the desired tote 300 for storage or can be removed from the desired tote 300 to fulfill a customer order or for further transporting or processing. The first to fourth actuator assemblies 200(1) to 200(4) can be implemented in a manner similar to that discussed above.

In some embodiments, the actuator assemblies 200(1) to 200(4) and conveyor segments 506, 508, 510, and 512 can operate in a unidirectional manner such the totes 300 can be moved in only a first direction (that is, clockwise or counterclockwise) around the conveying loop. Alternatively, the actuator assemblies 200(1) to 200(4) and the conveyor segments 506, 508, 550, and 512 can operate in a bidirectional manner such the totes 300 can be selectively rotated in one of the first direction and a second direction, opposite the first direction. The movement and positioning of totes 300 can be controlled by a controller 550, which can be in wired or wireless communication with the segments of the storage module. The controller 550 can control the speed and optionally the direction in which the totes are translated. Further, the controller 550 can stop translation of the totes when a desired tote is presented at one of the first and second ends 502 and 504.

Referring now more specifically to the details of the conveyor segments, the first conveyor segment 506 has a first longitudinal end 506a, and a second longitudinal end 506b that is offset from the first longitudinal end 506a along the first longitudinal direction $L_1$. The first conveyor segment 506 is elongate from the first longitudinal end 506a to the second longitudinal end 506b, and therefore, can be considered to be a first longitudinal conveyor segment. The first conveyor segment 506 has a first lateral side 506c and a second lateral side 506d spaced from the first lateral side 506c along the first lateral direction $A_1$, perpendicular to the first longitudinal direction $L_1$. The first conveyor segment 506 further has at least a one conveyor surface 506e (herein referred to as a first conveyor surface) that extends between the first and second longitudinal ends 506a and 506b and between the first and second lateral sides 506c and 506d.

The first actuator assembly 200(1) and the optional third actuator assembly 200(3) can be operatively associated with the first conveyor segment 506. The first actuator assembly 200(1) is disposed adjacent the first module end 502 and the third actuator assembly 200(3) is disposed adjacent the second module end 504. The first actuator assembly 200(1) (shown in FIG. 18) is configured to push totes 300 along the first conveyor segment 506 from the first longitudinal end 506a to the second longitudinal end 506b along the first longitudinal direction $L_1$ when the storage module 500 operates in a clockwise direction as viewed looking down on the first conveyor segment 506. Additionally or alternatively, the third actuator assembly 200(3) (shown in FIG. 18) is configured to push totes 300 along the first conveyor segment 506 from the second end 506b to the first end 506a along a second longitudinal direction $L_2$, opposite the first longitudinal direction $L_1$, when the storage module 500 operates in a counterclockwise direction as viewed looking down on the first conveyor segment 506. Each of the first and third actuator assemblies 200(1) and 200(3) can additionally or alternatively operate as an opposing actuator assembly as described above in relation to FIGS. 1 to 16.

The second conveyor segment 508 has a first longitudinal end 508a, and a second longitudinal end 508b that is offset from the first longitudinal end 508a along the first longitudinal direction $L_1$. The second conveyor segment 508 is elongate from the first longitudinal end 508a to the second longitudinal end 508b, and therefore, can be considered to be a second longitudinal conveyor segment. The second conveyor segment 508 has a first lateral side 508c and a second lateral side 508d spaced from the first lateral side 508c along the first lateral direction $A_1$. The second conveyor segment 508 further has at least one conveyor surface 508e (herein referred to as a second conveyor surface) that extends between the first and second longitudinal ends 508a and 508b and between the first and second lateral sides 508c and 508d.

The second actuator assembly 200(2) and the optional fourth actuator assembly 200(4) can be operatively associated with the second conveyor segment 508. The second actuator assembly 200(2) is disposed adjacent the second module end 504 and the fourth actuator assembly 200(4) is disposed adjacent the first module end 502. The second actuator assembly 200(2) (shown in FIG. 18) is configured to move totes 300 along the second conveyor segment 508 from the second end 508b to the first end 508a along the second longitudinal direction $L_2$ when the storage module 500 operates in a clockwise direction as viewed looking down on the second conveyor segment 508. Additionally or alternatively, the fourth actuator assembly 200(4) is configured to move totes 300 along the second conveyor segment 508 from the first end 508a to the second end 508b along a first longitudinal direction $L_1$ when the storage module 500 operates in a counterclockwise direction as viewed looking down on the second conveyor segment 508. Each of the second and fourth actuator assemblies 200(2) and 200(4) can additionally or alternatively operate as an opposing actuator assembly as described above in relation to FIGS. 1 to 16.

The second conveyor segment 508 is offset from the first conveyor segment 506 along the first lateral direction $A_1$. In some embodiments, the second conveyor segment 508 is offset from the first conveyor segment 506 by a distance that is no greater than an outer-most width of one of the first and second conveyor segments 506 and 508 along the first lateral direction $A_1$. For example, the first lateral side 508c of the second conveyor segment 508 can be adjoined to the second lateral side 506d of the first conveyor segment 506 as shown such that no gap exists between the first and second conveyor segments 506 and 508. As another example, the first lateral side 508c of the second conveyor segment 508 can be spaced from the second lateral side 506d of the first conveyor segment 506 such that a non-zero gap extends between the first and second conveyor segments 506 and 508, where the non-zero gap has a width along the first lateral direction $A_1$ from the second lateral side 506d of the first conveyor segment 506 to the first lateral side 508c of the second conveyor segment 508 that is no greater than the outer-most width of one of the first and second conveyor segments 506 and 508 along the first lateral direction $A_1$. It will be understood that larger gap sizes are possible. The width of the gap is inversely proportional to the storage density of the module 500. Smaller gap widths result in higher storage densities, while larger gap widths result in lower storage densities.

The third conveyor segment 550 has a first longitudinal side 550a, and a second longitudinal side 550b that is offset from the first longitudinal side 550a along the first longitudinal direction $L_1$. The third conveyor segment 550 has a first lateral end 550c, and a second lateral end 550d that is offset from the first lateral end 550c along the first lateral direction $A_1$. The third conveyor segment 550 further has a conveyor surface 550e (herein referred to as the third conveyor surface) that extends between the first and second longitudinal sides 550a and 550b and between the first and second lateral ends 550c and 550d.

The third conveyor segment 550 is offset from both the first and second conveyor segments 506 and 508 along the first longitudinal direction $L_1$. The first longitudinal side 550a of the third conveyor segment 550 can be adjoined to the second longitudinal end 506b of the first conveyor segment 506 and the second longitudinal end 508b of the second conveyor segment 508. Further, the third conveyor segment 550 extends from the second end 506b of the first conveyor segment 506 to the second end 508b of the second conveyor segment 508. Thus, the third conveyor segment 550 connects the first longitudinal conveyor segment 506 and the second longitudinal conveyor segment 508 to one another, and can therefore be considered to be a first connecting conveyor segment.

The third conveyor surface 550e is configured to translate totes 300 from the second end 506b of the first conveyor segment 506 to the second end 508b of the second conveyor segment 508 along the first lateral direction $A_1$ when the conveyor segments operate in a clockwise direction as viewed looking down on the third conveyor surface 550e. Additionally or alternatively, the third conveyor surface 550e is configured to translate totes 300 along a second lateral direction $A_2$, opposite the first lateral direction $A_1$, when the conveyor segments operate in a counterclockwise direction as viewed looking down on the third conveyor surface 550e. It will be understood that the third conveyor segment 550 can extend from the first conveyor segment 506 to the second conveyor segment 508 in a direction other than the first lateral direction $A_1$. For example, the third conveyor segment 550 can extend from the first conveyor segment 506 to the second conveyor segment 508 in a direction that is oblique to the first longitudinal direction $L_1$ or along a curved path.

The fourth conveyor segment 512 has a first longitudinal side 512a, and a second longitudinal side 512b that is offset from the first longitudinal side 512a along the first longitudinal direction $L_1$. The fourth conveyor segment 512 has a first lateral end 512c, and a second lateral end 512d that is offset from the first lateral end 512c along the first lateral direction $A_1$. The fourth conveyor segment 512 further has a conveyor surface 512e (herein referred to as the fourth conveyor surface) that extends between the first and second longitudinal sides 512a and 512b and between the first and second lateral ends 512c and 512d. At least one, up to all, of the first to fourth conveyor segments 506, 508, 550, and 512 can be aligned along a common horizontal plane. In at least some embodiments, at least one, up to all, of the surfaces 506e, 508e, 550e, and 512e of the first to fourth conveyor segments 506, 508, 550, and 512 can be aligned along a common horizontal plane.

The fourth conveyor segment 512 is offset from both the first and second conveyor segments 506 and 508 along the second longitudinal direction $L_2$. The second longitudinal side 512b of the fourth conveyor segment 512 can be adjoined to the first longitudinal end 506a of the first conveyor segment 506 and the first longitudinal end 508a of the second conveyor segment 508. Further, the fourth conveyor segment 512 extends from the first end 508a of the second conveyor segment 508 to the first end 506a of the first conveyor segment 506. Thus, the fourth conveyor segment 512 connects the first longitudinal conveyor segment 506 and the second longitudinal conveyor segment 508 to one another, and can therefore be considered to be a second connecting conveyor segment.

The fourth conveyor surface 512e is configured to translate totes 300 from the first end 508a of the second conveyor segment 508 to the first end 506a of the first conveyor segment 506 along the second lateral direction $A_2$ when the conveyor segments operate in a clockwise direction as viewed looking down on the fourth conveyor surface 512e. Additionally or alternatively, the fourth conveyor surface 512e is configured to translate totes 300 along the first lateral direction $A_1$ when the conveyor segments operate in a counterclockwise direction as viewed looking down on the fourth conveyor surface 512e. It will be understood that the fourth conveyor segment 512 can extend from the first conveyor segment 506 to the second conveyor segment 508 in a direction other than the first lateral direction $A_1$. For example, the fourth conveyor segment 512 can extend from the first conveyor segment 506 to the second conveyor segment 508 in a direction that is oblique to the first longitudinal direction $L_1$ or along a curved path.

In general, the conveyor segments 506, 508, 510, and 512 can be implemented using any suitable type of conveyor technology or any combination of suitable technologies. For example, each conveyor segment of the present disclosure can include at least one sliding surface (not shown), at least one rotating conveyor element, or any combination thereof, where each sliding surface or rotating conveyor element at least partially defines the conveyor surface of the conveyor segment. The at least one rotating conveyor element can include at least one powered rotating conveyor element that is configured to rotate in a direction that drives the totes 300 to translate along a respective one of the conveyor surfaces.

For example, the at least one powered rotating conveyor element can include (without limitation) (i) a motor-driven roller that is driven by a motor that is disposed within the roller such as those made by Interroll, (ii) a chain- or belt-driven roller that is driven by a chain or belt that is in turn driven by a motor that is external to the roller, (iii) a conveyor belt or wire-mesh belt, (iv) any other suitable powered rotating conveyor element, or (v) any combination thereof. The at least one powered rotating conveyor element can extend across only a portion of a conveyor segment such as (without limitation) adjacent an end of the conveyor segment, or can extend across an entire length of a conveyor segment. For example, a conveyor belt or wire-mesh belt can extend adjacent an end of the conveyor segment or can extend across an entire length of a conveyor segment. Similarly, one or more rollers can be disposed adjacent one end of the conveyor segment, or a plurality of rollers can be disposed across an entire length of the conveyor segment.

Additionally or alternatively, the at least one rotating conveyor element can include at least one unpowered rotating conveyor element that rotates in response to an item being translated thereon. The at least one unpowered rotating conveyor element can include (i) a ball, (ii) a roller, (iii) a skate wheel, (iv) any other suitable rotating conveyor element that is configured to roll in response to an tote being translated thereon, or (v) any combination thereof. The at least one powered rotating conveyor element can extend across only a portion of a conveyor segment such as (without limitation) adjacent a middle portion of the conveyor segment, or can extend across an entire length of a conveyor segment.

Referring now more specifically to the embodiment of FIGS. 17 and 18, the first conveyor segment 506 includes at least one unpowered rotating conveyor element 518 between the first and second ends 506a and 506b. The at least one unpowered rotating conveyor element 518 includes a pair of ball transfer conveyor strips spaced from one another along the first lateral direction $A_1$. Each strip has a plurality of balls aligned along the first longitudinal direction $L_1$, and each ball is configured to roll in response to an item being translated thereon. The first conveyor segment 506 can optionally include a first powered rotating conveyor element 514 adjacent the first end 506a and a second powered rotating conveyor element 516 adjacent the second end 506b. The first and second powered rotating conveyor elements 514 and 516 can supplement the movement of the totes 300 performed by the first and third actuator assemblies 200(1) and 200(3). It will be understood that, in alternative embodiments, the conveyor surface 506e of the first conveyor segment 506 can be implemented using any suitable type of conveyor technology or any combination of suitable technologies as described above.

The second conveyor segment 508 is implemented in a manner that is substantially similar to that of the first conveyor segment 506, although the second conveyor segment 508 is configured to translate items in a direction opposite from that of the first conveyor segment 506. The second conveyor segment 508 includes at least one unpowered rotating conveyor element 524 between the first and second ends 508a and 508b. The at least one unpowered rotating conveyor element 524 includes a pair of ball transfer conveyor strips spaced from one another along the first lateral direction $A_1$. Each strip has a plurality of balls aligned along the first longitudinal direction $L_1$, each ball configured to roll in response to an tote being translated thereon. The second conveyor segment 508 can optionally include a first powered rotating conveyor element 520 adjacent the first end 508a and a second powered rotating conveyor element 522 adjacent the second end 508b. The first and second powered rotating conveyor elements 520 and 522 can supplement the movement of the totes 300 performed by the second and fourth actuator assemblies 200(2) and 200(4). It will be understood that, in alternative embodiments, the conveyor surface 508e of the second conveyor segment 508 can be implemented using any suitable type of conveyor technology or any combination of suitable technologies as described above.

The third conveyor segment 550 includes a first powered rotating conveyor element 526 adjacent the first end 550c, a second powered rotating conveyor element 528 adjacent the second end 550d, and a third powered rotating conveyor element 530 between the first and second powered rotating conveyor elements 526 and 528. The first to third powered rotating conveyor elements 526 to 530 each include a powered roller having a central axis that extends along the first longitudinal direction $L_1$. The third conveyor segment 550 further includes at least one unpowered rotating conveyor element 532. The at least one unpowered rotating conveyor element 532 includes a ball transfer strip between the first and third powered rotating conveyor elements 526 and 530, and a ball transfer strip between the second and third powered rotating conveyor elements 528 and 530. The at least one unpowered rotating conveyor element 532 can further include a ball transfer strip between the first powered rotating conveyor element 526 and the first end 550c, and a ball transfer strip between the second powered rotating conveyor element 528 and the second end 550d. Each ball transfer strip has a plurality of balls aligned along the first longitudinal direction $L_1$, each ball configured to roll in response to an tote being translated thereon. It will be understood that, in alternative embodiments, the conveyor surface 550e of the third conveyor segment 550 can be implemented using any suitable type of conveyor technology or any combination of suitable technologies as described above.

The fourth conveyor segment 512 is implemented in a manner that is substantially similar to that of the third conveyor segment 550, although the fourth conveyor segment 512 is configured to translate items in a direction opposite from that of the third conveyor segment 550. The fourth conveyor segment 512 includes a first powered rotating conveyor element 534 adjacent the first end 512c, a second powered rotating conveyor element 136 adjacent the second end 512d, and a third powered rotating conveyor element 538 between the first and second powered rotating conveyor elements 534 and 536. The first to third powered rotating conveyor elements 534 to 538 each include a powered roller having a central axis that extends along the first longitudinal direction $L_1$. The fourth conveyor segment 512 can further include at least one unpowered rotating conveyor element 540. The at least one unpowered rotating conveyor element 540 includes a ball transfer strip between the first and third powered rotating conveyor elements 534 and 538, and a ball transfer strip between the second and third powered rotating conveyor elements 536 and 538. The at least one unpowered rotating conveyor element 540 can further include a ball transfer strip between the first powered rotating conveyor element 534 and the first end 512c, and a ball transfer strip between the second powered rotating conveyor element 536 and the second end 512d. Each ball transfer strip has a plurality of balls aligned along the first longitudinal direction $L_1$, each ball configured to roll in response to an tote being translated thereon. It will be understood that, in alternative embodiments, the conveyor surface 512e of the fourth conveyor segment 512 can be implemented using any suitable type of conveyor technology or any combination of suitable technologies as described above.

Turning now to FIGS. 19 to 22, a system is shown comprising the storage module 500 and a plurality of the totes 300 arranged in various rotational positions. The totes 300 are densely packed along the first and second conveyor segments 506 and 508. For example, the totes 300 carried by the first conveyor segment 506 are arranged end-to-end such that there is little to no space between adjacent ones of the totes 300. Similarly, the totes 300 carried by the second conveyor segment 508 are arranged end-to-end such that there is little to no space between adjacent ones of the totes 300. In some embodiments, totes 300 along each conveyor segment may contact one another other. In other embodiments, totes 300 may be spaced from each other by a distance that is no more than 10 percent of the length of each tote 300 along the conveyor segment or no more than 5 percent of the length of each tote 300 along the conveyor segment. In some embodiments, the storage module 500 can be configured such that each of at least one of the totes 300 may have one or more tote 300 stacked on top of the tote 300. Stacking the totes 300 on top of one another can increase the storage density of the storage module 500 over that of storage modules in which the totes are not stacked.

One method of translating the totes 300 around the horizontal conveying loop of the storage module 500 in a clockwise direction according to one embodiment will now be described in connection with FIGS. 19 to 22. In this method, a single tote 300 is transitioned between the first and second sides 501 and 503 of the module 500 at a time. As the totes 300 are translated around the horizontal conveying loop, the orientation of each carrier 300 remains fixed. Thus, the second end wall 308 of each carrier 300 remains spaced from the first end wall 306 of the carrier 300 along the first longitudinal direction $L_1$ as the carrier 300 is translated along each of the first to fourth conveyor segments 506 to 512. It will be understood that the carriers 300 can additionally or alternatively be translated in a counter-clockwise direction. Further, it will be understood that, in alternative embodiments (such as those in which the third and fourth conveyor segments 550 and 512 extend along a curved path), the orientation of each tote 300 can rotate as the carrier 300 is translated around the horizontal conveying loop. For example, the orientation of each tote 300 can rotate such that the second sidewall 304 remains inwardly spaced from the first sidewall 306 as the carrier 300 is translated along each of the first to fourth conveyor segments 506 to 512.

In FIGS. 19 and 20, a step is shown that comprises causing the totes 300 to be translated from the first module side 501 to the second module side 503. This step can comprise causing a first tote 300(1) to be driven by the third conveyor segment 550 along the first lateral direction $A_1$ so as to be vertically aligned with the second conveyor segment 508. The first tote 300(1) can be driven by at least one powered rotating element such as powered rotating elements 526, 528, and 530 (FIG. 17). In alternative embodiments, the third conveyor segment 550 can be devoid of powered rotating conveyor elements, and the totes can be driven along the first lateral direction $A_1$ by an actuator or other mechanism.

In FIGS. 20 to 21, a step is shown that comprises causing the totes to be translated along the second module side 503 along the second longitudinal direction $L_2$. This step can comprise the second actuator assembly 200(2) pushing the first tote 300(1) from the third conveyor segment 510 onto the second conveyor segment 508 along the second longitudinal direction $L_2$. The first tote 300(1) in turn pushes the totes in front of it in the second longitudinal direction $L_2$ over the unpowered rotating elements 524 of the second conveyor segment 508 until a second tote 300(2) is disposed on the fourth conveyor segment 512. The unpowered rotating conveyor elements 524 of the second segment 508 are configured to spin in response to the totes being translated thereon so as to limit the amount of force that is needed to push the totes.

In FIGS. 21 to 22, a step is shown that comprises causing the totes to be translated from the second module side 503 to the first module side 501 along the second lateral direction $A_1$. This step can comprise causing the second tote 300(2) to be driven by the fourth conveyor segment 512 along the second lateral direction $A_2$ so as to be vertically aligned with the first conveyor segment 506. The second tote 300(2) can be driven by at least one powered rotating element such as powered rotating elements 534, 536, and 538 (FIG. 17). In alternative embodiments, the fourth conveyor segment 512 can be devoid of powered rotating conveyor elements, and the totes can be driven along the second lateral direction $A_2$ by an actuator or other mechanism.

After FIG. 22, the method can include a step that comprises causing the totes 300 to be translated along the first module side 501 along a first longitudinal direction $L_1$. This step can comprise the first actuator assembly 300(1) pushing the second tote 300(2) from the fourth conveyor segment 512 onto the first conveyor segment 506 along the first longitudinal direction $L_1$. The second tote 300(2) in turn pushes the totes in front of it in the first longitudinal direction $L_1$ over the unpowered rotating elements 518 of the first conveyor segment 506 until a third tote 300(3) is disposed on the third conveyor segment 510. The unpowered rotating conveyor elements 518 of the second segment 508 are configured to spin in response to the totes being translated thereon so as to limit the amount of force that is needed to push the totes. It will be understood that method of FIGS. 19 to 22 can begin at any one of the steps of FIGS. 19 to 22, depending on the positions of the storage carriers 300. Further, at least one, up to all, of the steps in FIGS. 19 to 22 can be repeated as desired to present a desired one of the storage containers 300 at one of the first and second ends 502 and 504.

Figure 23:
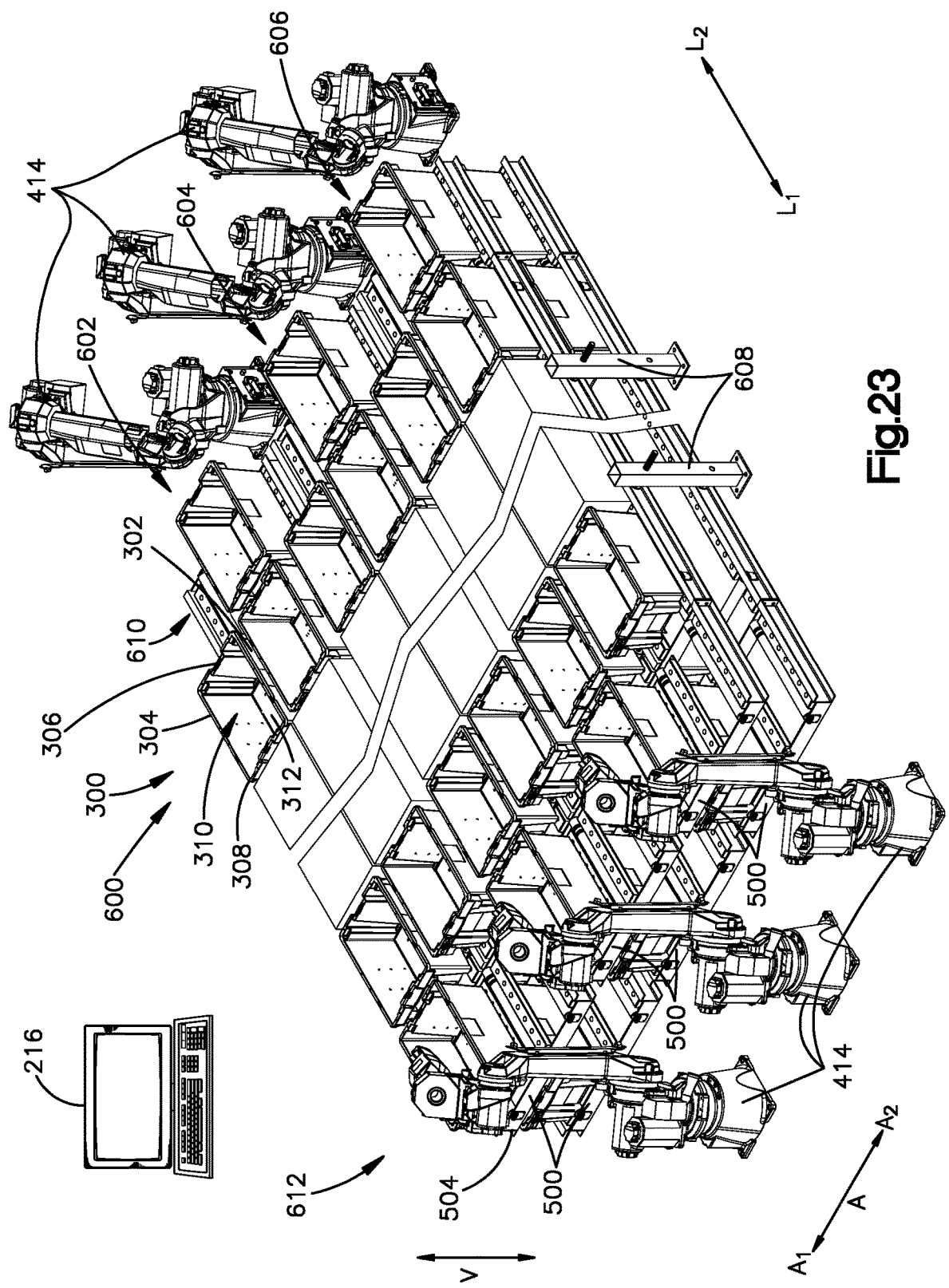
FIG. 23 shows a perspective view of a storage and retrieval system according to one embodiment that comprises a plurality of instances of the storage module of FIG. 17 and a plurality of totes.

Referring now to FIG. 23, a modular storage and retrieval system 600 is shown that comprises a plurality of instances of the storage module 500 of FIG. 17, each supporting a plurality of totes 300. Note that the actuator assemblies 200(1) to 200(4) are not shown for illustrative purposes. Further, some totes 300 around the middle of the system 600 are shown as solid boxes for illustrative purposes. In general, storage systems of the disclosure can include at least one vertical stack of storage modules that comprises at least two of the storage modules stacked on top of one another along the vertical direction V. In at least some embodiments, the system 600 can include the totes 300 supported by the system 600, although it will be understood that the system 600 can be made and sold without the totes 300.

In FIG. 23, the storage system 600 comprises a first system end 610, and a second system end 612 that is spaced from the first system end 610 along the first longitudinal direction $L_1$. The storage system 600 includes a plurality of instances of the storage module 500, each extending from the first system end 610 to the second system end 612. The plurality of storage modules 500 includes a first vertical stack 602 of the storage modules 500 that comprises a plurality (e.g., at least two) of the storage modules 500 stacked on top of one another along the vertical direction V. The storage system 600 further includes a second vertical stack 604 of the storage modules 500 that comprises a plurality (e.g., at least two) of the storage modules 500 stacked on top of one another along the vertical direction V. The second vertical stack 604 can be offset from the first vertical stack 602 along the lateral direction A. The storage system 600 can yet further include a third vertical stack 606 of the storage modules 500 that comprises a plurality (e.g., at least two) of the storage modules 500 stacked on top of one another along the vertical direction V. The third vertical stack 606 can be offset from the second vertical stack 604 along the lateral direction A such that the second vertical stack 604 is between the first and third vertical stacks 602 and 606.

Each storage module 500 of the system 600 can be independently operated such that the totes 300 of each storage module 500 can be driven around their corresponding conveying loop independently of the totes 300 of other storage modules 500 being driven around their corresponding conveying loop. Although three vertical stacks 602, 604, and 606, each having two storage modules 500 are shown, it will be understood that the number of vertical stacks and storage modules 500 in each vertical stack can vary from that shown. In particular, modular storage and retrieval systems of the disclosure can include at least one vertical stack of storage modules 500 or more than one vertical stack of storage modules 500. Further, each vertical stack of storage modules 500 can have at least two storage modules 500 stacked on top of one another or more than two storage modules 500. Thus, height, width, and length of the system 600 can be scalable to fit within a desired volume in a warehouse space.

The modular storage and retrieval storage system 600 can include supports 608 that are coupled to the storage modules 500 in each vertical stack 602, 604, and 606 so as to maintain the storage modules 500 in a stacked relation. The supports 608 can further be coupled to the storage modules 500 so as to attach the vertical stacks 602, 604, and 606 of storage modules 500 to one another. The supports 608 can combine to form a frame of the system 600.

The totes 300 can be stacked on top of one another so that the space between each tote 300 and a storage module 500 immediately over top of the tote 300 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the totes, such as a spacing that is no more than 20 percent of the height of the tote, such as no more than 15 percent of the height of the tote, such as no more than 10 percent of the height of the tote, or such as no more than 5 percent of the height of the tote. Storage density is inversely proportional to the distance between an tote and the storage module immediate over top of the tote 300. Thus, as this distance is decreased, the storage density increases. However, if this distance is too small, then an tote 300 might not freely rotate along their respective conveying loops, and might collide with the storage module 500 immediately over top of the tote 300.

The modular storage and retrieval system 600 can also include at least one robotic manipulator 414 and at least one controller 416 that can be implemented as described above in relation to FIGS. 15 and 16. For example, the system 600 can include at least one robotic manipulator 414 that services the first module end 502 of each vertical stack of storage modules 500. The system 200 can additionally or alternatively include at least one robotic manipulator 414 that services the second module end 504 of each vertical stack of storage modules 500 as shown. In some embodiments, the manipulators 414 at the first module ends 502 can be used to stow inventory items or totes 300 in the storage modules 500, and the manipulators 414 at the second module end 504 can be used to retrieve inventory items or totes 300 from the storage modules 500. Alternative embodiments can include at least manipulator 414 on only one end of a vertical stack, the at least one manipulator 414 configured to perform both stowing and retrieving operations. Additionally or alternatively, one or more of the robotic manipulators 414 can service multiple vertical stacks of storage modules 500. Although not shown, in some embodiments, the at least one robotic manipulator 414 can be configured to move vertically and/or horizontally to service the storage modules 500 of the system 200. For example, a robotic manipulator 414 can be mounted on a horizontal and/or vertical track to enable it to move with respect to the vertical stacks.

Other material conveyance devices (not shown) may also be disposed adjacent to the robotic manipulators 414. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 414.

In operation, a method of operating the system 600 comprises causing a desired tote 300 in the system 600 to be identified to either retrieve an inventory item from or stow an inventory item into. Further, the method comprises causing a location of the tote 300 in the system 600 to be identified. Identifying the location can include identifying the storage module 500 that supports the identified tote 300 and optionally the position of the tote 300 on the identified storage module 500. Once the location is identified, the method comprises causing the totes 300 of the identified storage module 500 to be translated around the conveying loop of the identified storage module 500 until the desired tote 300 is presented at a desired one of the first and second ends 502 and 504 of the identified storage module 500.

The translating step can comprise causing the totes to be transferred between the first and second conveyor segments along the third and fourth conveyor segments. The translating step can include causing a first actuator 202(1) of the first actuator assembly 200(1) to actuate and move a first crossbar 204 that is coupled to the first actuator 202(1) in a first longitudinal direction $L_1$ such that the first crossbar 204 pushes totes 300 along the first conveyor segment 506 in the first longitudinal direction $L_1$. Causing the first actuator 202(1) of the first actuator assembly 200(1) to actuate can comprise causing the first crossbar 204 to pass over at least one of the totes 300 along the second longitudinal direction $L_2$, causing the first crossbar 204 to be moved to a lowered position that is vertically aligned with the at least one tote 300, and causing the first crossbar 204 to push the at least one tote 300 along the first conveyor segment 506 in the first longitudinal direction $L_1$.

The translating step can include causing a first actuator 202(1) of the second actuator assembly 200(2) to actuate and move a second crossbar 204 that is coupled to the first actuator 202(1) of the second actuator assembly 202(2) in the second longitudinal direction $L_2$ such that the second crossbar 204 pushes totes 300 along the second conveyor segment 508 in the second longitudinal direction $L_2$. Causing the first actuator 202(1) of the second actuator assembly 200(2) to actuate can comprise causing the second crossbar 204 to pass over at least one of the totes 300 along the first longitudinal direction $L_1$, causing the second crossbar 204 to be moved to a lowered position that is vertically aligned with the at least one tote 300, and causing the second crossbar 204 to push the at least one tote 300 along the second conveyor segment 508 in the second longitudinal direction $L_2$.

The method then comprises retrieving an inventory item from the desired tote 300, or stowing an inventory item into the desired tote 300. This step can be performed by a human who manually retrieves an inventory item from the desired tote 300 or stows the inventory item into the desired tote 300. Alternatively, this step can comprise causing a robotic manipulator 414 to move so as to retrieve an inventory item from the desired tote 300, or stow an inventory item into the desired tote 300. In some embodiments, the human or robotic manipulator 414 can retrieve the desired tote 300 itself from the system 200, and then the inventory item can be retrieved from the desired tote 300. The tote 300 can then be stowed by the human or a robotic manipulator 414 onto a desired one of the storage modules 500. In so doing, the tote 300 can be stowed onto the same storage module 500 from which the tote 300 was retrieved for can be stowed in a different storage module. At least one, up to all, of these steps can be controlled by the controller 416.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A storage module configured to store inventory items, the storage module comprising:
   a first module end, and a second module end spaced from the first module end along a first longitudinal direction;
   a plurality of conveyor segments that define a conveying loop, the storage module configured to convey storage totes around the conveying loop until a desired one of the storage totes is presented at one of the first module end and the second module end, the conveyor segments comprising:
      a first conveyor segment configured to convey storage totes arranged end-to-end along the first longitudinal direction;
      a second conveyor segment configured to convey storage totes arranged end-to-end along a second longitudinal direction, opposite the first longitudinal direction;
      a third conveyor segment configured to convey storage totes from the first conveyor segment to the second conveyor segment at the first module end; and
      a fourth conveyor segment configured to convey storage totes from the second conveyor segment to the first conveyor segment at the second module end;
   a first actuator assembly disposed at the first end, the first actuator assembly comprising a first actuator and a first crossbar connected to the first actuator, the first actuator assembly configured to move the first crossbar in the first longitudinal direction such that the first crossbar engages and moves storage totes along the first conveyor segment in the first longitudinal direction; and
   a second actuator assembly disposed at the second end, the second actuator assembly comprising a first actuator and a second crossbar connected to the first actuator of the second actuator assembly, the second actuator assembly configured to move the second crossbar in the second longitudinal direction such that the second crossbar engages and moves storage totes along the second conveyor segment in the second longitudinal direction,
   wherein the first and second actuator assemblies each comprise a second actuator, the first and second actuators of each of the first and second actuator assemblies are spaced from one another along a lateral direction, and the first and second crossbars extend between the first and second actuators of the first and second actuator assemblies, respectively.

2. The storage module of claim 1, wherein the first actuator of each of the first and second actuator assemblies is a linear actuator comprising a housing and a piston rod configured to retract into the housing and extend from the housing.

3. The storage module of claim 1, wherein the first and second actuators each include a crossbar raising and lowering mechanism configured to move the first and second crossbars between a raised position, and a lowered position that is spaced below the raised position along a vertical direction.

4. The storage module of claim 3, wherein the first and second crossbars are configured to be vertically aligned with storage totes along the first longitudinal direction when the first and second crossbars are in the lowered position, and the first and second crossbars are configured to be vertically offset from storage totes when the first and second crossbars are in the raised position.

5. The storage module of claim 3, wherein each crossbar raising and lowering mechanism includes an arm that is pivotally coupled to the piston rod, a wheel or roller that is rotationally coupled to the arm, and a track that is configured to guide the wheel or roller so as to move the crossbar between the raised and lowered positions.

6. The storage module of claim 5, wherein the track includes a lower track segment, an upper track segment spaced above the lower track segment, and a hinged segment that is pivotally coupled to the upper track segment, and wherein the wheel or roller is configured to pass under the hinged segment when the wheel or roller is advanced in a select longitudinal direction and is configured to ride up the hinged segment onto the upper track when the wheel or roller is advanced in a direction opposite the select longitudinal direction.

7. The storage module of claim 1, comprising:
   a third actuator assembly disposed at the second end, the third actuator assembly comprising a first actuator and a third crossbar connected to the first actuator of the third actuator assembly, the third actuator assembly configured to move the third crossbar in the second longitudinal direction such that the third crossbar engages storage totes on the first conveyor segment; and
   a fourth actuator assembly disposed at the first end, the fourth actuator assembly comprising a first actuator and a fourth crossbar connected to the first actuator of the fourth actuator assembly, the fourth actuator assembly configured to move the fourth crossbar in the first longitudinal direction such that the fourth crossbar engages storage totes on the second conveyor segment.

8. The storage module of claim 7, wherein the third actuator assembly is configured to move the third crossbar in the second longitudinal direction such that the third crossbar moves storage totes on the first conveyor segment along the second longitudinal direction, and the fourth actuator assembly configured to move the fourth crossbar in the first longitudinal direction such that the fourth crossbar moves storage totes on the second conveyor segment along the first longitudinal direction.

9. The storage module of claim 7, wherein the storage module has a first module side, and a second module side spaced from the first module side along a first lateral direction, each of the first and second crossbars has an outer side surface that extends in a direction from the first module side to the second module side, and the first and second crossbars are configured such that their respective outer side surfaces engage ends of the storage totes when the first and second crossbars move the storage totes.

10. A storage module configured to store inventory items, the storage module comprising:
   a first module end, and a second module end spaced from the first module end along a first longitudinal direction;
   a plurality of conveyor segments that define a conveying loop, the storage module configured to convey storage totes around the conveying loop until a desired one of the storage totes is presented at one of the first module end and the second module end, the conveyor segments comprising:
- a first conveyor segment configured to convey storage totes arranged end-to-end along the first longitudinal direction;
- a second conveyor segment configured to convey storage totes arranged end-to-end along a second longitudinal direction, opposite the first longitudinal direction;
- a third conveyor segment configured to convey storage totes from the first conveyor segment to the second conveyor segment at the first module end; and
- a fourth conveyor segment configured to convey storage totes from the second conveyor segment to the first conveyor segment at the second module end;
a first actuator assembly disposed at the first end, the first actuator assembly comprising a first actuator and a first crossbar connected to the first actuator, the first actuator assembly configured to move the first crossbar in the first longitudinal direction such that the first crossbar engages and moves storage totes along the first conveyor segment in the first longitudinal direction; and
a second actuator assembly disposed at the second end, the second actuator assembly comprising a first actuator and a second crossbar connected to the first actuator of the second actuator assembly, the second actuator assembly configured to move the second crossbar in the second longitudinal direction such that the second crossbar engages and moves storage totes along the second conveyor segment in the second longitudinal direction,
  - wherein the first conveyor segment is spaced above the second conveyor segment, the storage module comprises a first vertical lift that includes the third conveyor segment, the storage module comprises a second vertical lift that includes the fourth conveyor segment, and the first and second vertical lifts are configured to raise and lower the third and fourth conveyor segments, respectively, so as to transfer storage totes between the first and second conveyor segments.

11. The storage module of claim 1, wherein the second conveyor segment is offset from the first conveyor segment along a first lateral direction, and each of the third and fourth conveyor segments extend from the first conveyor segment to the second conveyor segment along the first lateral direction.

12. A storage system, comprising:
the storage module of claim 1 and
a plurality of the storage totes.

13. The storage system of claim 12, wherein each storage tote has an overall carrier width along a first lateral direction, perpendicular to the first longitudinal direction, and the storage module has an overall module width along the first lateral direction, the overall module width being greater than the overall carrier width such that the storage module is configured to support at least two of the storage totes side-by-side along the first lateral direction.

14. A storage system configured to store inventory items, the storage system comprising a plurality of storage modules, each comprising:
- a first module end, and a second module end spaced from the first module end along a first longitudinal direction;
- a plurality of conveyor segments that define a conveying loop, the storage module configured to convey storage totes around the conveying loop until a desired one of the storage totes is presented at one of the first module end and the second module end, the conveyor segments comprising:
  - a first conveyor segment configured to convey storage totes arranged end-to-end along the first longitudinal direction;
  - a second conveyor segment configured to convey storage totes arranged end-to-end along a second longitudinal direction, opposite the first longitudinal direction;
  - a third conveyor segment configured to convey storage totes from the first conveyor segment to the second conveyor segment at the first module end; and
  - a fourth conveyor segment configured to convey storage totes from the second conveyor segment to the first conveyor segment at the second module end;
- a first actuator assembly disposed at the first end, the first actuator assembly comprising a first actuator and a first crossbar connected to the first actuator, the first actuator assembly configured to move the first crossbar in the first longitudinal direction such that the first crossbar engages and moves storage totes along the first conveyor segment in the first longitudinal direction; and
- a second actuator assembly disposed at the second end, the second actuator assembly comprising a first actuator and a second crossbar connected to the first actuator of the second actuator assembly, the second actuator assembly configured to move the second crossbar in the second longitudinal direction such that the second crossbar engages and moves storage totes along the second conveyor segment in the second longitudinal direction, wherein the plurality of storage modules includes at least one vertical stack that includes at least two of the storage modules stacked on top of one another along a vertical direction.

15. The storage system of claim 14, wherein the plurality of storage modules includes at least first and second vertical stacks, each including at least two of the storage module stacked on top of one another along a vertical direction, the first and second vertical stacks being offset from one another along a lateral direction.

* * * * *